US005894308A

United States Patent [19]

Isaacs

[11] Patent Number: 5,894,308
[45] Date of Patent: Apr. 13, 1999

[54] INTERACTIVELY REDUCING POLYGON COUNT IN THREE-DIMENSIONAL GRAPHIC OBJECTS

[75] Inventor: Paul M. Isaacs, San Francisco, Calif.

[73] Assignee: Silicon Graphics, Inc., Mountain View, Calif., CA

[21] Appl. No.: 08/640,003

[22] Filed: Apr. 30, 1996

[51] Int. Cl.$^6$ .................................................. G06T 5/00
[52] U.S. Cl. .................................................. 345/420
[58] Field of Search .................... 345/420, 419, 345/423, 424

[56] References Cited

U.S. PATENT DOCUMENTS 5,359,704  10/1994  Rossignac et al. ............... 395/122
5,448,686   9/1995  Borrel et al. .................... 395/120

OTHER PUBLICATIONS

Schroeder, William J., Johnathan A. Zarge, William E. Lorenson. "Decimation of Triangle Meshes", *Computer Graphics*, vol. 26, No. 2, Jul. 1992, pp. 65–70.

Rossignac, Jarek R. and Paul Borrel. "Multi–Resolution 3D Approximations for Rendering Complex Scenes", Research Report, IBM Research Division, *Computer Science*, Feb. 19, 1992, pp. 1–4.

DeHaemer, Michael J., Jr. and Michael J. Zyda. "Simplification of Objeccts Rendered by Polygonal Approximations", *Computer & Graphics*, vol. 15, No. 21, 1991, pp. 175–184.

*Primary Examiner*—Phu K. Nguyen
*Assistant Examiner*—Cliff N. Vo
*Attorney, Agent, or Firm*—Fish & Richardson P.C.

[57] ABSTRACT

The number of polygons in a 3D graphic object is adjusted by receiving interactive input from a user through a user-interface abstraction, and altering the number of polygons in the 3D graphic object in real time based on the input received from the user.

49 Claims, 28 Drawing Sheets

INTERACTIVELY REDUCING POLYGON COUNT IN THREE-DIMENSIONAL GRAPHIC OBJECTS

BACKGROUND

This invention relates to the modeling and rendering of 3D graphic objects.

Modeling and rendering of 3D graphic objects are used, for example, to generate 3D virtual scenes on the display screen of a computer system. The surface topology of a 3D object may be modeled as a set of polygons of appropriate sizes and shapes joined at their edges. The set of polygons defining the 3D object is referred to as the "model" or "mesh" for the 3D object. If the 3D object is to be displayed in wire-frame form, only the edge lines that form the polygons in the mesh are rendered, thus generating a skeleton-like image of the object. For example, the model of an X-29 aircraft shown in FIG. 2a consists of 957 unfilled polygons joined together at their edges to form a wire-frame representation of the aircraft. A more realistic rendering of the 3D object may be achieved by filling in the polygons with various colors as appropriate, for example, as shown in FIG. 2b, by taking into account lighting, texture and surface properties of the object under consideration.

A complex or detailed 3D object may be composed of several thousand or more polygons. Because each polygon takes a finite amount of time for the computer to draw, an object being modeled by a large number of polygons takes proportionately longer to render. Various algorithmic techniques have been suggested in the art for reducing the number of polygons in a 3D model, such as those described by Jarek R. Rossignac and Paul Borrel in "Multi-Resolution 3D Approximations for Rendering Complex Scenes," IBM Research Report (1992), and by William J. Schroeder, Jonathon A. Zarge and William E. Lorensen in "Decimation of Triangle Meshes," *Computer Graphics*, Vol. 26, No. 2, pp. 65–70, July 1992. However, although reducing the number of polygons in a 3D model decreases the amount of time it takes the computer to render the 3D object, the quality of the resultant image also is reduced. Consequently, in modeling 3D objects, a developer strives to find the optimal balance between image quality and rendering time.

One technique for optimizing the number of polygons in a 3D object involves the creation and use of multiple levels-of-detail ("LOD") for the 3D object. Multiple versions of the same 3D object are created such that each version has a successively lower polygon count (and thus a lower level-of-detail) and such that each version is associated with a different viewing range. FIGS. 3a shows a high polygon count LOD for an airplane and FIG. 3b shows a LOD for the same airplane having a somewhat lower polygon count. When the airplane is to be rendered at a point relatively close to the viewer's eye, a high polygon count (equivalently, a high LOD) version of the object such as that in FIG. 3a is used, thus providing the viewer with greater detail for the object.

As the 3D object moves farther from the viewer's eye, the viewer requires, and expects to see, fewer details of the 3D object. Accordingly, a lower polygon count version of the object (as shown in FIG. 3b) may used in rendering the object, thus increasing system performance proportionately to the degree by which the polygon count was reduced.

Ideally, the various versions of the 3D object, and the associated viewing ranges at which they become active, should be crafted such that the attendant loss of detail as the 3D object moves farther from the eye is inconsequential to the viewer. In this manner, system performance may be increased without unduly degrading image quality. In practice, constructing an appropriate set of LOD's for a model can be a painstaking and difficult task for model authors. This further motivates the need for improved polygon reduction tools.

What is needed is an effective methodology for reducing polygon count in 3D object models without resulting in unpredictable degradation in image quality. The methodology should be effective whether or not multiple LOD versions of the model are being created.

SUMMARY

A 3D graphic object is modeled as subelements by displaying user-interface abstractions which respectively represent different criteria for altering the number of subelements in the 3D graphic object. Input is received from a user through at least one of the user-interface abstractions and is used to alter the number of subelements in the 3D graphic object.

The subelements may comprise polygons, or more specifically, triangles.

The 3D graphic object having the altered number of subelements may be displayed to the user, who may select which particular surfaces (e.g., interior or exterior) of the 3D graphic object are to be rendered.

A computer file representative of the 3D graphic object having the altered number of subelements may be created and stored for future use, for example, to associate the altered version of the 3D graphic object with a particular viewing range or level of detail.

In modeling the 3D graphic object, the 3D graphic object may be displayed in its original state prior to receiving input from the user. The display of the 3D graphic object may be modified substantially in real time based on the user's input to provide visual feedback to the user. Using this visual feedback, the user may provide subsequent input to further refine the number of subelements in the 3D graphic object.

Several different techniques for altering the number of subelements in the 3D object are available, either used singly or in various combinations of two or more. For example, the 3D object may be modeled as an octahedron or as a bounding box that envelops the original 3D object.

The number of subelements in the 3D object also may be altered by deleting points in the 3D graphic object based on curvature of the subelements; by discarding polygons in the 3D graphic object by area; by discarding polygon edges in the 3D graphic object by length; or by merging initial coordinates in the 3D graphic object.

The user may be given the ability to override certain aspects of the alteration of the subelements in the 3D object. For example, the user may be allowed to select lock points on the 3D object which are not to be disturbed in the course of altering subelements.

The external outline of the 3D object may be preserved by allowing the user to conserve surface boundary edges in the 3D graphic object.

The number of subelements in a 3D graphic object may be changed by displaying a user-interface abstraction which represents a predetermined criterion for altering the number of subelements in the 3D graphic object. Input is received interactively from a user through the user-interface abstraction and is used to provide visual feedback to the user on how the input affects the number of subelements in the 3D graphic object. This visual feedback may be delivered to the user substantially in real time.

The resulting representation of the 3D object following the change may be associated with a particular level of detail and/or viewing range for the 3D graphic object.

An interface for a computer system includes a display of a 3D graphic object which comprises a quantity of polygons. A graphical interface device allows a user to interactively alter the polygon quantity. As a result, the display of the 3D graphic object is altered substantially in real time in response to the user's alteration of the polygon quantity.

The graphical user interface may include various user-interface abstractions which respectively represent different criteria for altering the polygon quantity based on input from the user. Another user-interface abstraction may enable the user to override alteration of the polygon quantity.

The number of polygons in a 3D graphic object may be reduced by locating a polygon edge in the 3D object, defined by points A and B, that is shorter than a predetermined length. One or both of points A and B may be eliminated in accordance with a predetermined basis for comparison. In one embodiment, one of point A and point B is used to replace the other. Alternatively, a third point may be used to replace each of points A and B.

The basis for comparison used in the elimination process may depend on the relative average lengths of the polygons connected to points A and B, respectively. For example, point A may be replaced with point B if point A has a shorter average connected edge length than B.

The processes of locating and eliminating may be repeated until no polygon edge shorter than the predetermined length remains in the 3D graphic object.

The predetermined length against which the polygon edges are compared may have been received previously from a user in an interactive manner.

The number of polygons in a 3D graphic object also may be reduced by locating a polygon in the 3D graphic object that has an area less than the threshold size. The polygon in defined by the points $A_1$ through $A_n$ where n is a positive integer greater than 2. A selected one of points $A_1$ through $A_n$ is used to replace the remaining points in accordance with a predetermined basis of comparison, for example, the one point out of $A_1$ through $A_n$ that is determined to have the longest average connected edge length (defined as the sum of the edge lengths connected to a point divided by the number of edges connected to that point) is used to replace all of the other points.

The processes of locating and replacing may be repeated until no polygon having an area less than the threshold size remains in the 3D graphic object.

The threshold size against which the polygons are compared may have been received previously from a user in an interactive manner.

Another method of reducing the number of polygons in a 3D graphic object comprises interactively receiving a threshold value from a user, locating points in the 3D graphic object that collectively have a property value that is less than the threshold value; and eliminating at least one of the located points from the 3D graphic object. The located points may define a polygon edge and the property under consideration may be length. Alternatively, the located points may define a polygon and the property may be area.

Still another method of reducing the number of polygons in a 3D graphic object, comprises interactively receiving a threshold value from a user, locating a point in the 3D graphic object at which the curvature between adjacent polygons is smaller than the threshold value, and removing all polygon edges connected to that point to create a void. The void may then be filled, for example, by triangulation.

Yet another method of reducing the number of polygons in a 3D graphic object comprises interactively receiving a threshold value from a user and dividing the 3D graphic into logical units based on the threshold value received from the user. Each logical unit encompasses at least one polygon apex. All but one of the polygon apexes are then removed from each logical unit.

Advantages of the invention may include one or more of the following:

Through the use of graphical user-interface abstractions such as sliders, buttons and point markers, a developer of 3D scenes ("the user") is provided with a highly interactive tool for reducing the polygon count in a model of a 3D graphic object.

The user is able to selectively apply varying degrees of polygon reduction using any combination of several different algorithms.

The user is provided immediate visual feedback on the impact of the user's selections on image quality.

The user can rapidly experiment and fine-tune the proper level of polygon reduction for the intended purpose by calling upon various algorithms and judging for himself which approach yields results that look best.

The user is provided with tools that can interactively override certain aspects of the selected polygon reduction algorithm(s). These tools allow the user to customize the resulting image and eliminate unwanted artifacts.

An interactive polygon-reduction tool is integrated conveniently into an interactive tool for defining multiple levels-of-detail ("LOD"). This provides an ideal environment for 3D authors to create multiple LODs for each object and interactively fine-tune each level for optimal balance of performance and image quality.

An effective methodology is provided for converting a 3D model into triangulated form (i.e., representing it entirely with triangles), and then rapidly constructing a data structure which includes an internal graph relating vertices and edges within the model. This data structure allows polygon reduction operations to be performed rapidly enough to provide the user with a real time, interactive polygon reduction environment.

Other advantages and features will become apparent from the following description and claims.

DETAILED DESCRIPTION OF THE PREFERRED EMBODIMENT

Figure 1:
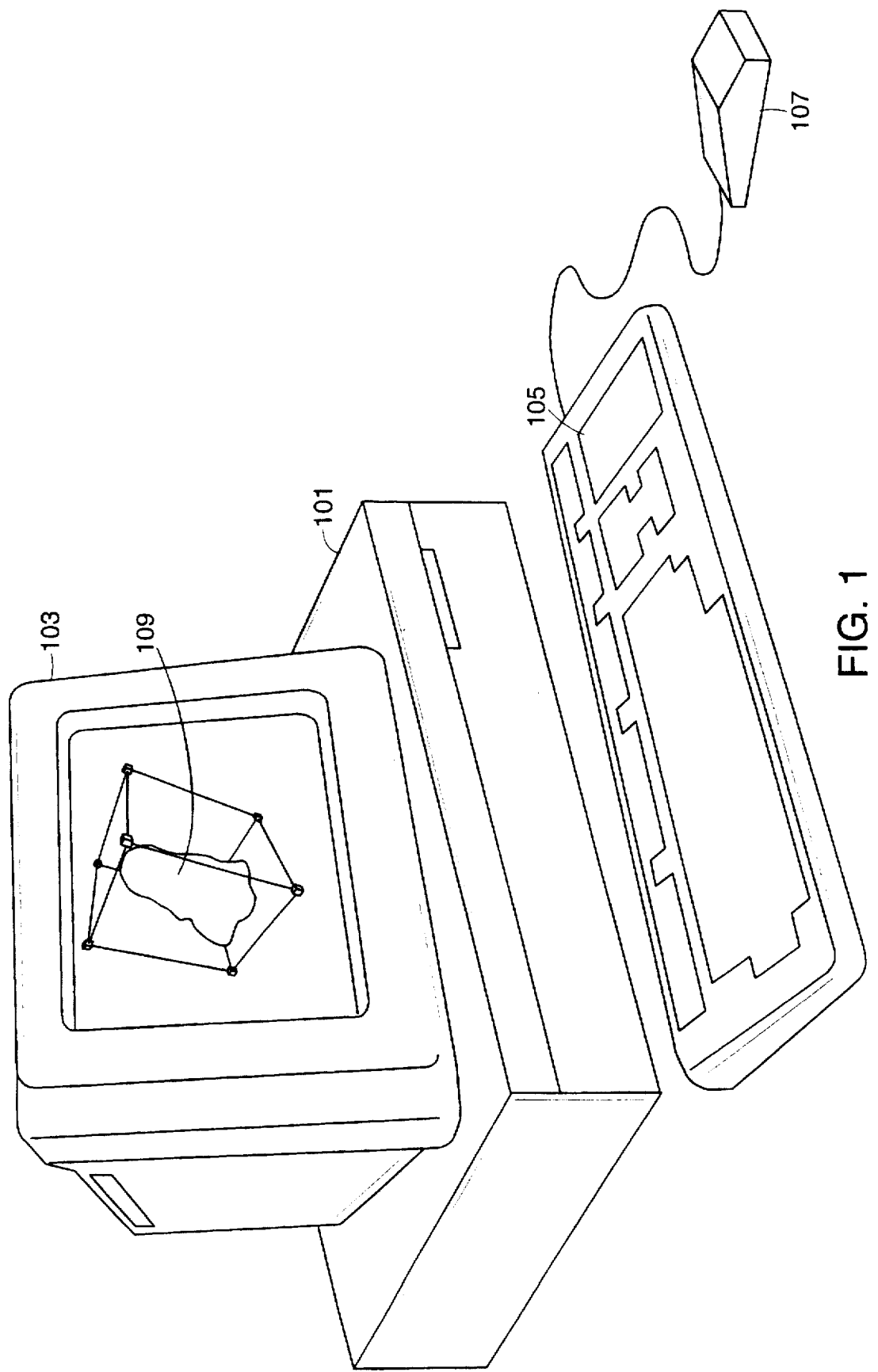
FIG. 1 is a computer system displaying a 3D image.
Figure 2A:
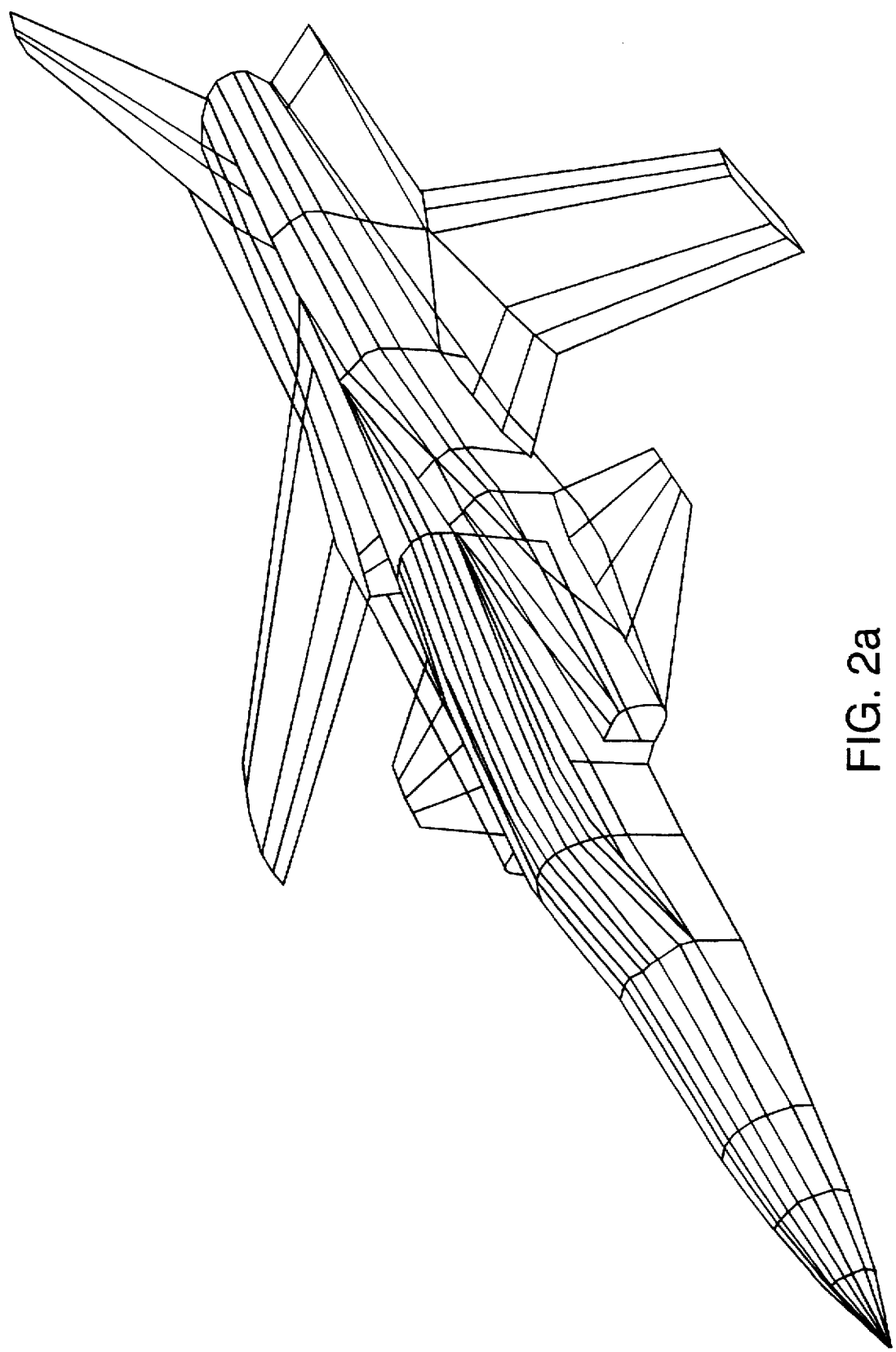
FIG. 2a is a wire-frame representation of a 3D graphic object.
Figure 2B:
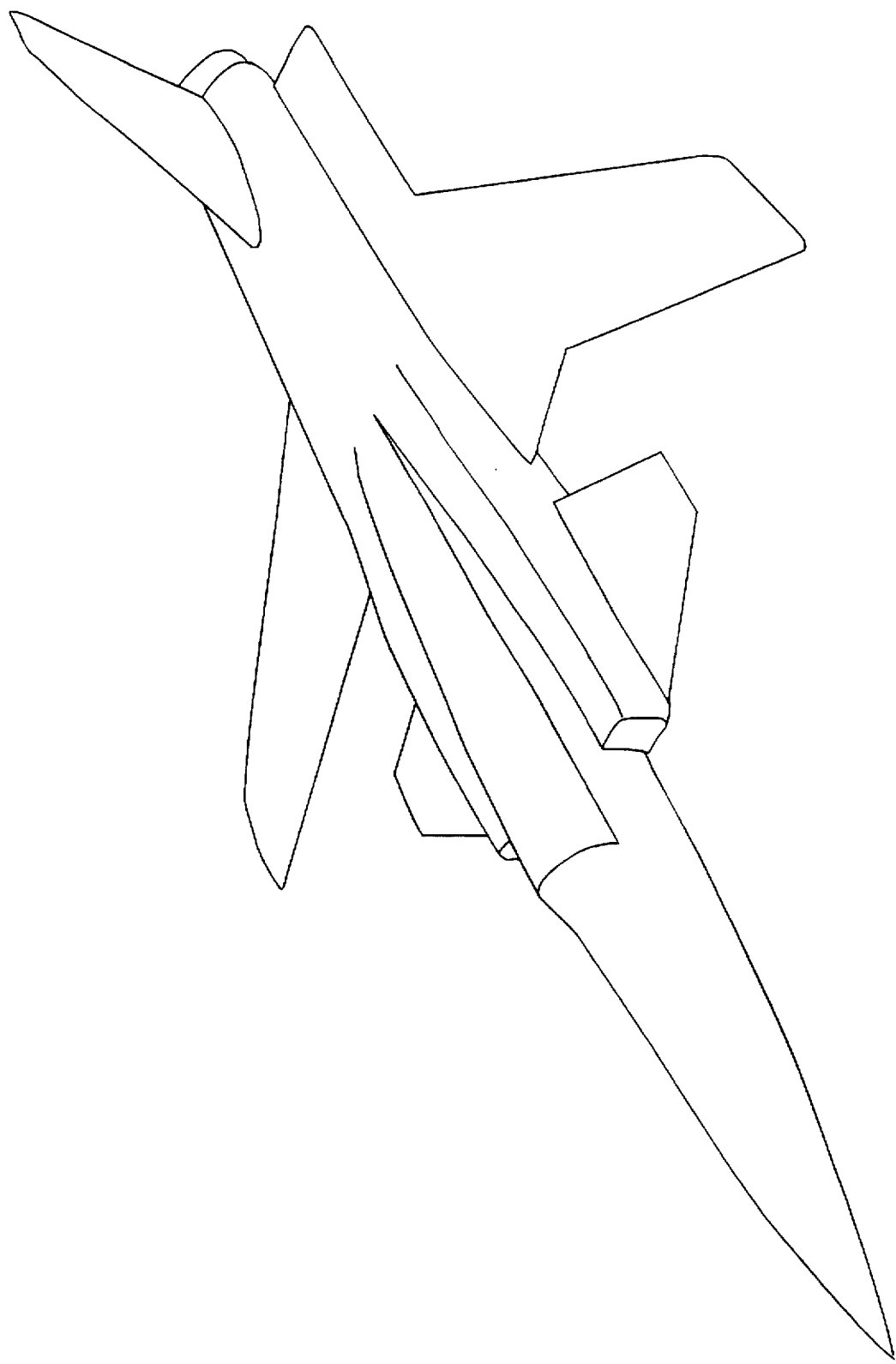
FIG. 2b is a solid-surface representation of a 3D graphic object.
Figures 3A, 3B:
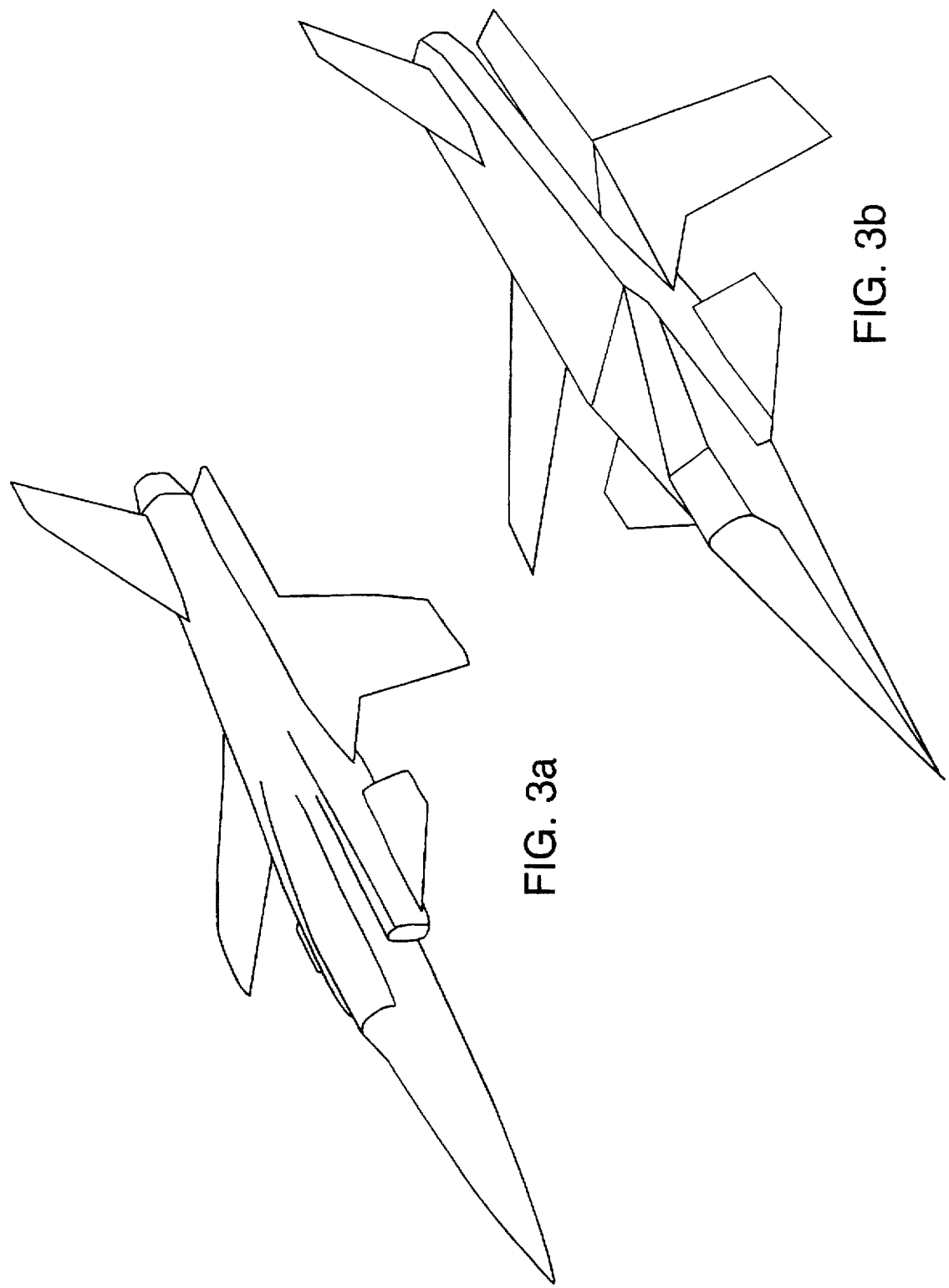
FIGS. 3a and 3b are two different levels of detail for a single 3D graphic object.

A preferred embodiment of the present invention will now be described in detail. The computer system illustrated in FIG. 1—including cursor control device 107, keyboard 105, CPU 101 and CRT 103—represents a hardware setup for running software that allows a user to view and/or create virtual 3D objects. The techniques described here were implemented on Silicon Graphics machines using the Open Inventor toolkit, Motif, OpenGL, and the C++ programming language and apply to any computer system that has a display device such as CRT 103.

Figure 4A:
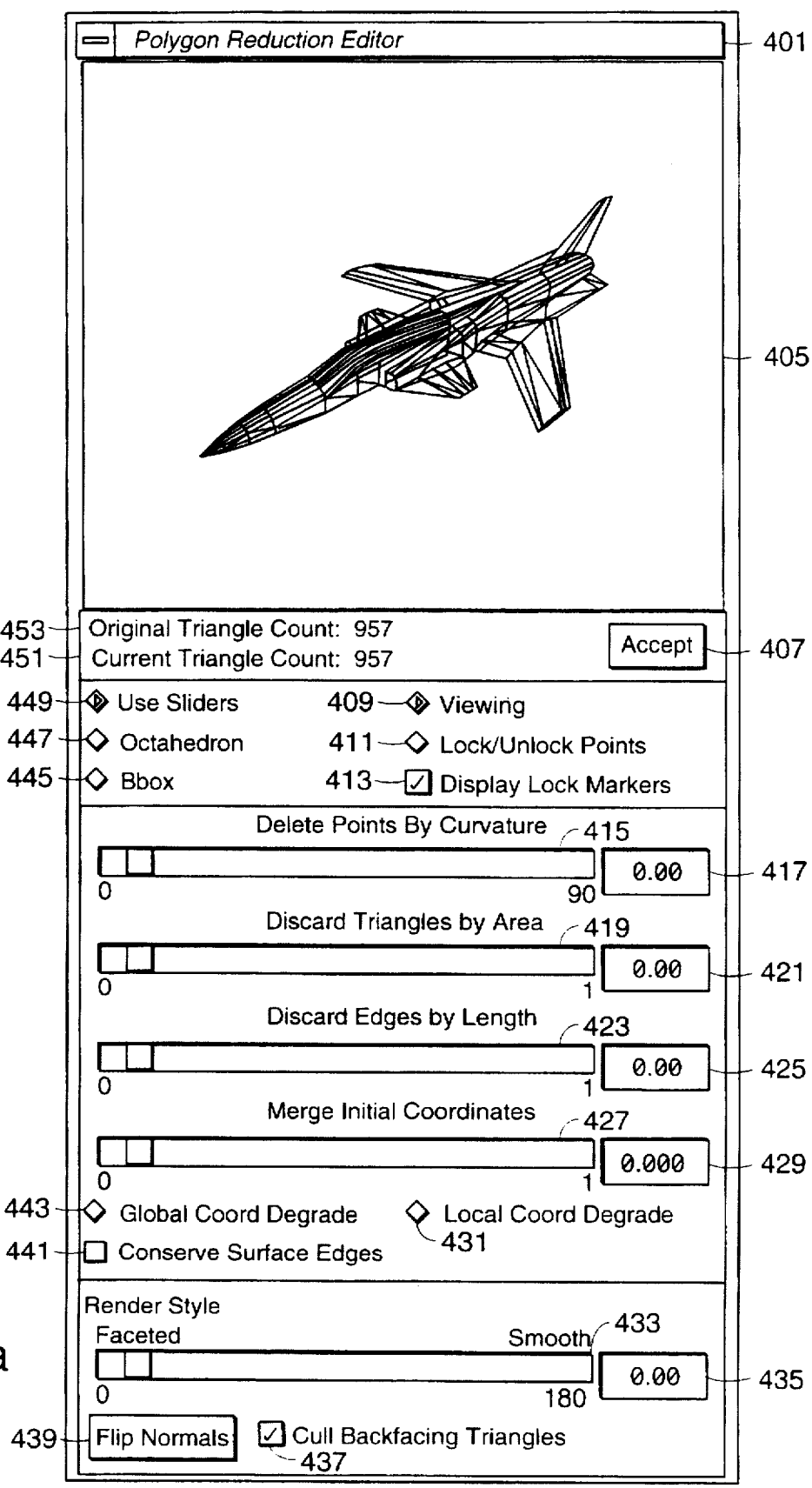
FIGS. 4a through 7b are exemplary screen displays from the polygon reduction editor program.
Figure 4B:
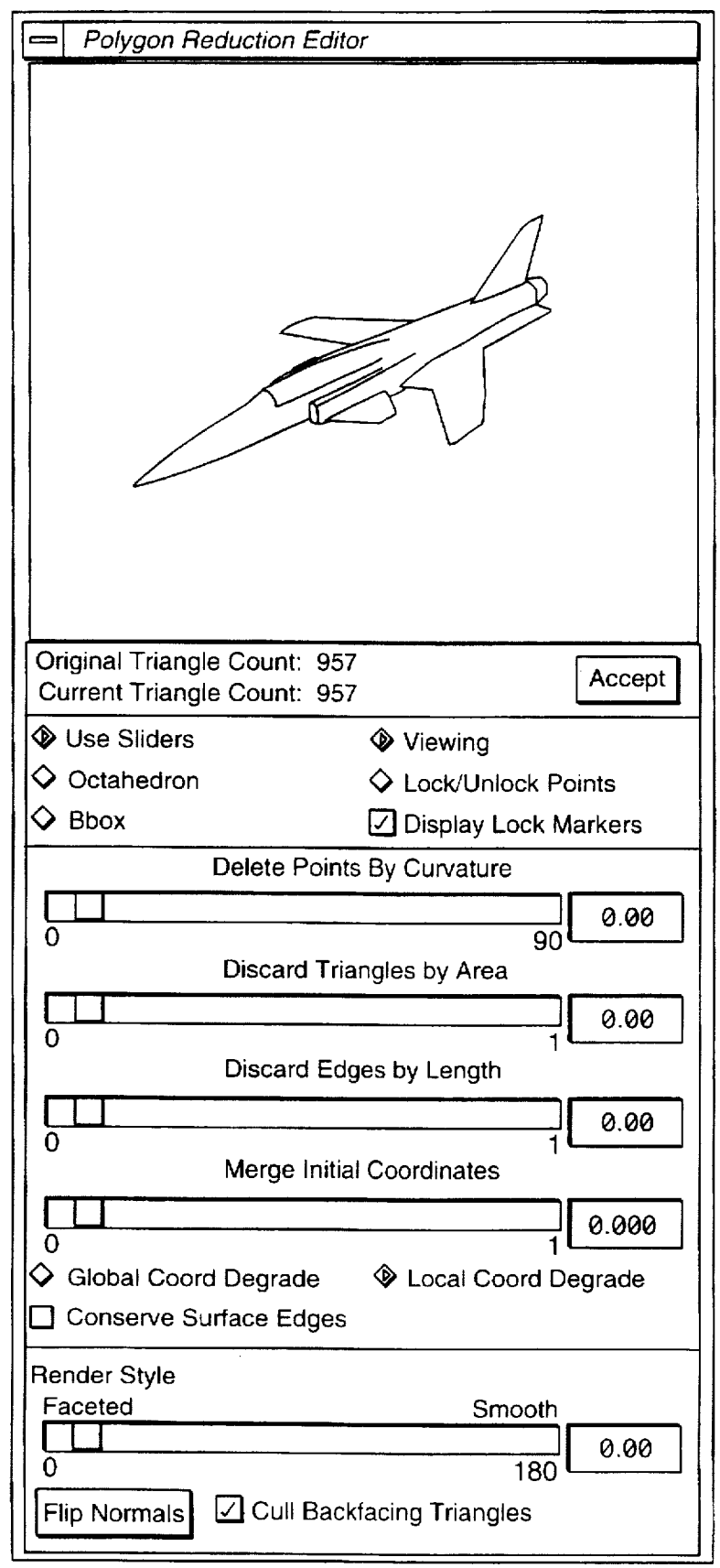

The Polygon Reduction Editor, which is a component of Silicon Graphics' WebSpace Author® system, represents one preferred embodiment of the present invention. The Polygon Reduction Editor is a tool that allows a user (or 3D content developer) to reduce the polygon count within models of 3D graphic objects in an interactive and real time manner. The Polygon Reduction Editor is conveniently integrated within an authoring environment for creating multiple LODs for each 3D model, as desired. FIGS. 4a and 4b are sample screen displays from the Polygon Reduction Editor showing a 3D graphic object (an X-29 aircraft) in wire-frame and solid surface form, respectively. Instructions for using selected features of the Polygon Reduction Editor are attached as Appendix A.

The Polygon Reduction Editor is embodied as a graphical user interface (GUI) within a window 401, and includes a display region 405 for displaying the 3D object at its current polygon count. The GUI includes various user-interface abstractions 407-449 ("widgets") to provide the user with a number of different methods for varying the number of polygons in the 3D object.

The number of polygons—triangles, in this particular embodiment—comprising the original 3D object (i.e., the 3D object at its highest LOD) is indicated at 453 ("Original Triangle Count") and the number of triangles presently in the 3D object is indicated at 451 ("Current Triangle Count"). In the screen displays of FIGS. 4a and 4b, the number of triangles has not yet been reduced so that the Original Triangle Count and the Current Triangle Count each read 957 and the 3D object 403 is rendered in display region 405 at its highest LOD.

To modify the number of triangles in the 3D object, the user interactively manipulates one or more of the widgets 407-449 until the desired result is achieved. Typically, a cursor control device such as a mouse is used to manipulate widgets 407-449 although any other input device could be used for this purpose. In response to manipulation of widgets 407-449, the 3D object is redrawn in real time using the modified number of triangles.

The Polygon Reduction Editor is capable of providing the user with a real time, interactive environment in part because of the particular modeling methodology it uses. Specifically, the Polygon Reduction Editor models a 3D object by converting it into triangulated form (that is, by creating a model of the 3D object using triangles exclusively), and then rapidly constructing data structures representative of an internal graph that relates vertices and edges within the model. The particular data structures used by the Polygon Reduction Editor are declared in the C++ header file attached as Appendix B.

These data structures provide several performance benefits that allow the Polygon Reduction Editor to perform polygon reduction operations rapidly enough to provide the user with a real time, interactive polygon reduction environment. For example, given a particular polygon edge in the 3D mesh, the Polygon Reduction Editor can quickly identify the points defining that edge and all triangles containing that edge. Similarly, given a particular point in the 3D mesh, the Polygon Reduction Editor can quickly identify all edges containing that point. Given a particular triangle, the Polygon Reduction Editor can quickly identify the edges and points that define it. In addition, because the 3D object is modeled entirely by triangles, the Polygon Reduction Editor can take advantage of the fact that a given triangle in the mesh disappears entirely whenever any one of its three defining points is removed.

When a 3D model is initially converted, co-located points are merged to share unique point representations. For example, the following pseudo-notation in Table I describes a representation for two triangles. The array "points" is a list of all points used in the shape under consideration. The array "polygons" is a list of the polygons of the shape, in this case two triangles.

points[0]=0,0,0
points[1]=0,1,0
points[2]=1,1,0
points[3]=0,1,0
points[4]=0,0,0
points[5]=1,1,0
polygon[0]32 points[0], points[1], points[2]
polygon[1]32 points[3], points[4], points[5]

Note that points[0] is the same as points[4], and that points[1] is the same as points[3]. Accordingly, upon initial conversion, this representation would be changed to:

points[0]=0,0,0
points[1]=0,1,0
points[2]=1,1,0
points[3]=1,1,0
polygon[0]=points[0], points[1], points[2]
polygon[1]=points[1], points[0], points[3]

All of the coordinate values contained in this new list of are unique relative to the others.

These co-located points are removed in order to have the most topologically reduced representation of the model. In this representation, all edges that meet at a given location will refer to the same "point" data structure. If this step is not performed, the risk of "ripping holes" in the mesh arises when some, but not all, of the edges that meet at a given vertex are moved.

Each time the Polygon Reduction Editor converts a new 3D model into triangulated form, the duration for that conversion is measured and is used as a benchmark to control subsequent operations. If the initial triangulation exceeds a threshold duration (one second in the preferred embodiment), it indicates that the 3D object under consideration is sufficiently complex and/or large that each cycle of polygon reduction calculations would require a substantial amount of time. Although each subsequent polygon reduction cycle would likely take significantly less than the initial triangulation time of one or more seconds, it would be substantial enough that it could diminish the real time interactive nature of the Polygon Reduction Editor. Accordingly, if the initial triangulation time exceeds one second, the Polygon Reduction Editor limits the frequency of subsequent cycles of polygon reduction calculations such that only one occurs for each mouse button up/down cycle.

On the other hand, if the initial triangulation time is less than one second, the 3D object mesh is recalculated and rendered on a substantially continuous basis. In this manner, the interactivity of the Polygon Reduction Editor is consistently maintained at a suitably high level regardless of the size and complexity of the 3D object under consideration.

Although 3D objects in the Polygon Reduction Editor are modeled using only triangles, the techniques described here may be applied to any other class or combination of classes of polygons (e.g., rectangles) to achieve similar results.

The Polygon Reduction Editor provides the user with six primary techniques for reducing the number of polygons in a 3D object: (1) forming an octahedron around the 3D object; (2) forming a bounding box around the 3D object; (3) deleting points in the 3D object by curvature; (4) discarding polygons in the 3D object by area; (5) discarding edges in the 3D object by length; and (6) merging initial coordinates in the 3D object.

The latter four techniques (3–6) each may be used separately or together in various combinations of two or more. In addition, these four techniques may be used in conjunction with either or both of two additional features—(a) locking user-selected points in the 3D graphic object and (b) conserving surface boundary edges in the 3D graphic object. Each of these techniques and features is discussed in detail.

Octahedron/Bounding Box

Figure 5:
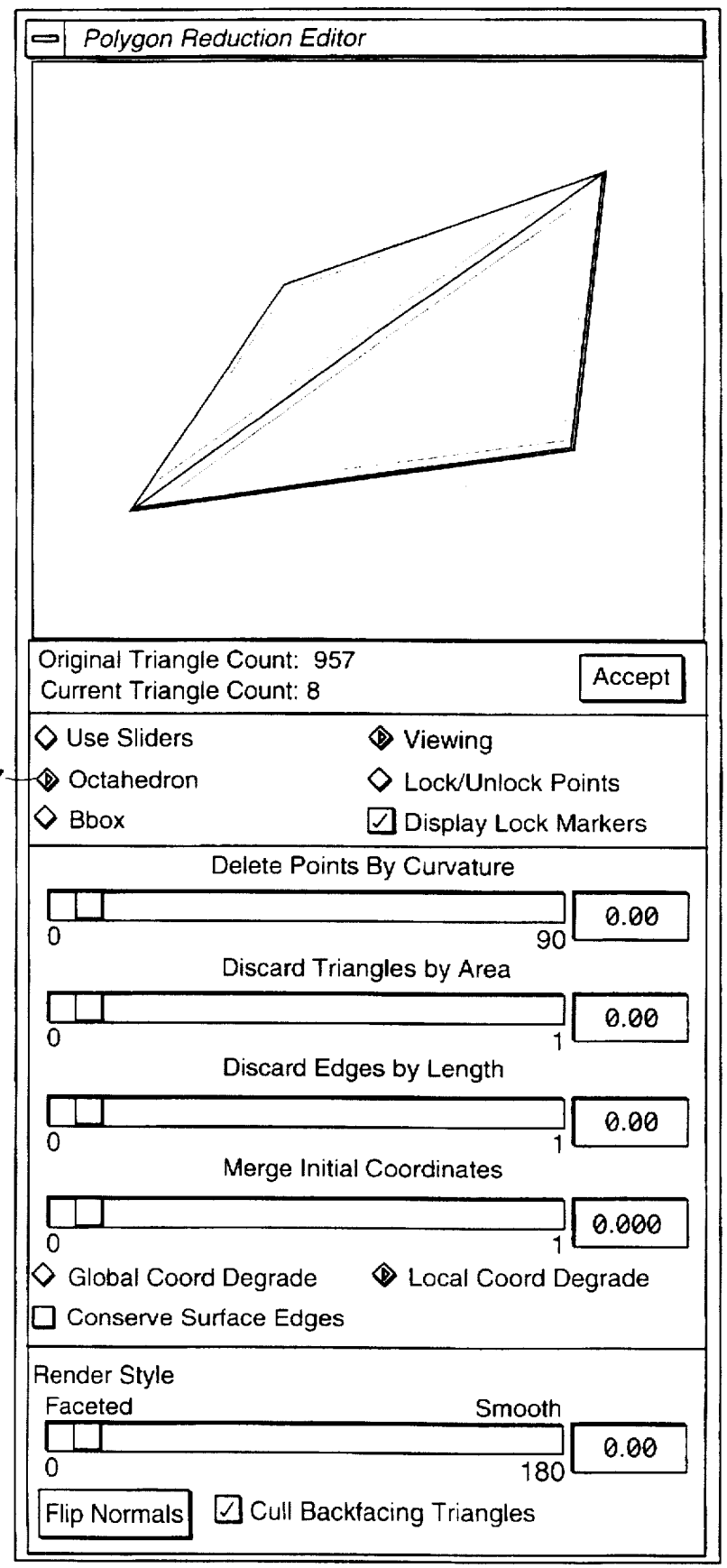
Figure 6:
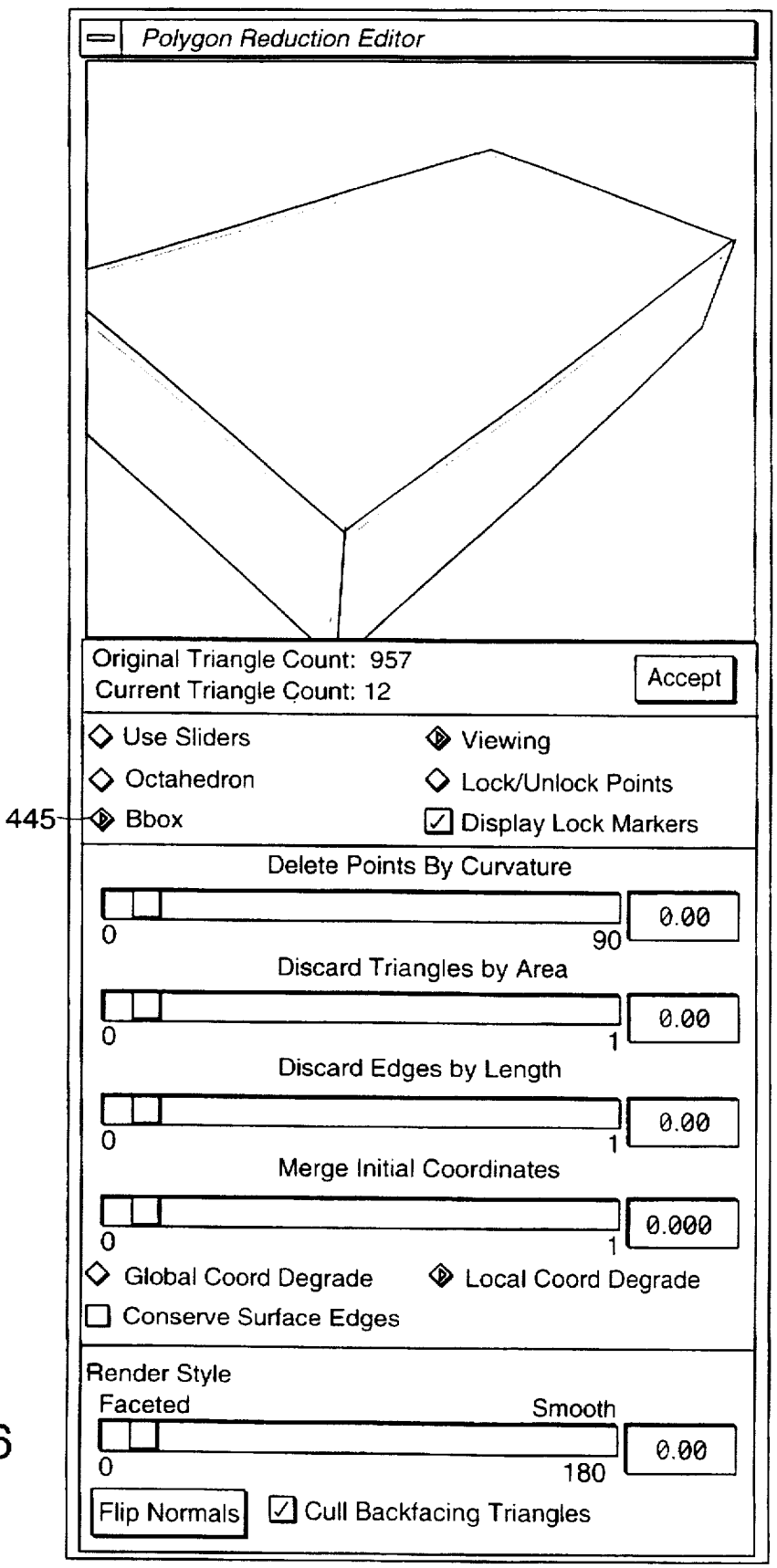

FIGS. 5 and 6 depict the simplest techniques for reducing the triangle count in a 3D object by using an octahedron or a bounding box, respectively, to approximate the 3D object. Although these techniques are relatively crude, they realize a drastic reduction in the number of triangles—for example, from 957 to 8 in the case of the octahedron and from 957 to 12 in the case of the bounding box—and thus may prove useful as LODs for very distant viewing ranges at which very little detail is expected by the viewer.

When one of these two triangle reduction techniques is to be invoked, the user clicks on the desired one of the Octahedron button 447 or the Bbox button 445. If the Bbox button 445 is selected, the Polygon Reduction Editor generates a 3D object model using twelve triangles connected at their edges to form a box as shown in FIG. 6. The sides of the bounding box are parallel to the central axes of the 3D object and intersect the apex points of the 3D object in each of the three dimensions.

If the Octahedron button 447 is selected, the Polygon Reduction Editor generates a 3D object model using eight connected triangles as shown in FIG. 5. The octahedron is formed by connecting the six points at which the apex points of the 3D object would intersect an imaginary bounding box. If more than one apex point exists for the 3D object in any one dimension, the average of those points is used in constructing the octahedron.

Discard Edges By Length

Figure 7A:
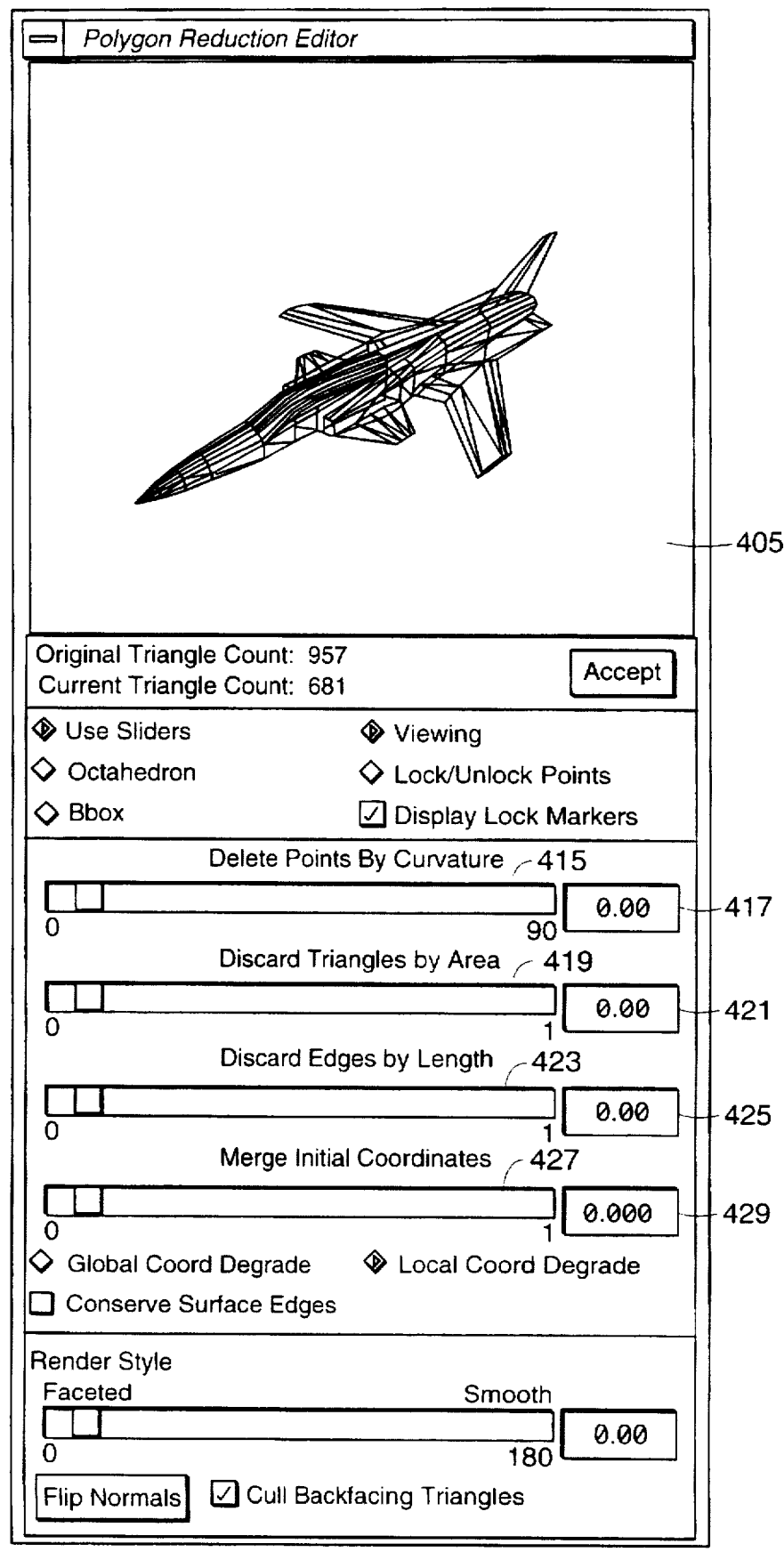
Figure 7B:
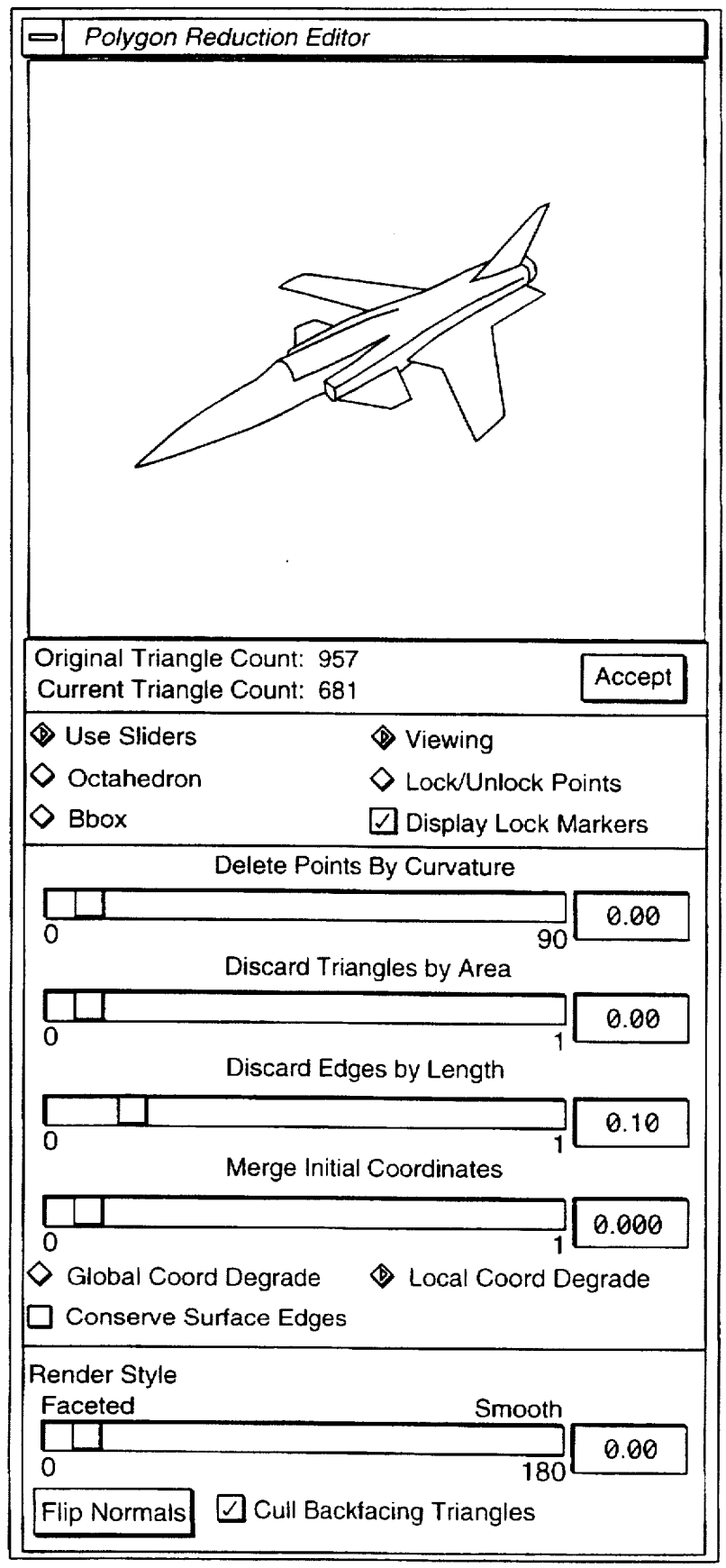

FIGS. 7a and 7b are sample screen displays from the Polygon Reduction Editor showing the 3D object (the X-29 aircraft) in wire-frame and solid surface form, respectively. In this example, the triangle count has been reduced from the original 957 to 681 using the Discard Edges By Length technique. As can be seen from the screen displays, degradation in image quality is slight even though the number of polygons has been reduced nearly by one-third. Of the various polygon reduction techniques employed, Discard Edges By Length has proven to give the best results, especially when used in conjunction with the Conserve Surface Edges and Lock Points features, discussed below.

The Discard Edges By Length technique is invoked first by clicking the Use Sliders button 449, which activates widgets 415–429, and then by moving slider 423 to the desired position. The polygon reduction algorithm underlying the Discard Edges By Length slider 423 calculates the lengths of all triangle edges in the 3D object and discards those edges having lengths less than the value indicated in numeric display 425 as chosen by the user using slider 423. The range of lengths that may be selected ranges from 0 to 1; the maximum value, 1, represents the normalized length of the 3D object in its longest possible dimension (the length of the diagonal of an imaginary bounding box for the 3D object).

In the example shown in FIGS. 7a–7b, the user has moved slider 423 from the zero position (at which no edges are discarded) to a position corresponding to 0.10 as indicated in numeric display 425. In response, the Polygon Reduction Editor removes all triangle edges shorter than 0.10 of the longest dimension in the 3D object and redraws 3D object 403 in display region 405 using the reduced number of triangles.

Figure 8A:
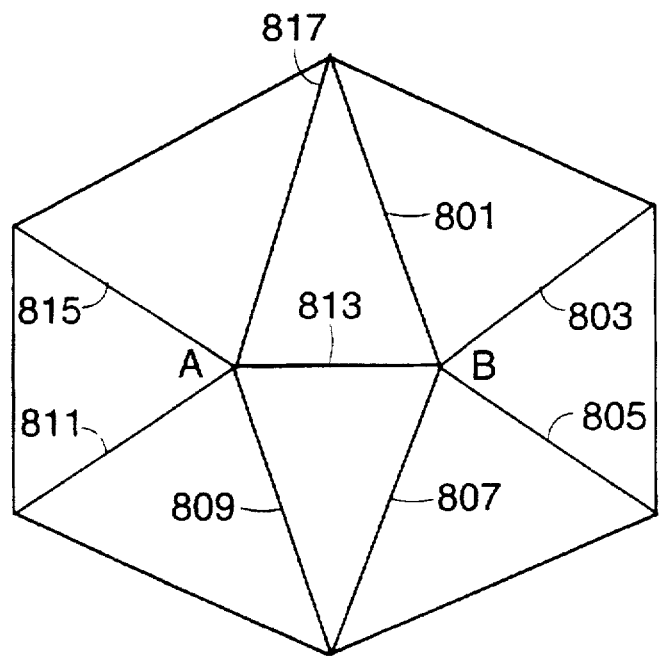
FIGS. 8a and 8b are sequential views of a triangulated surface.
Figure 8B:
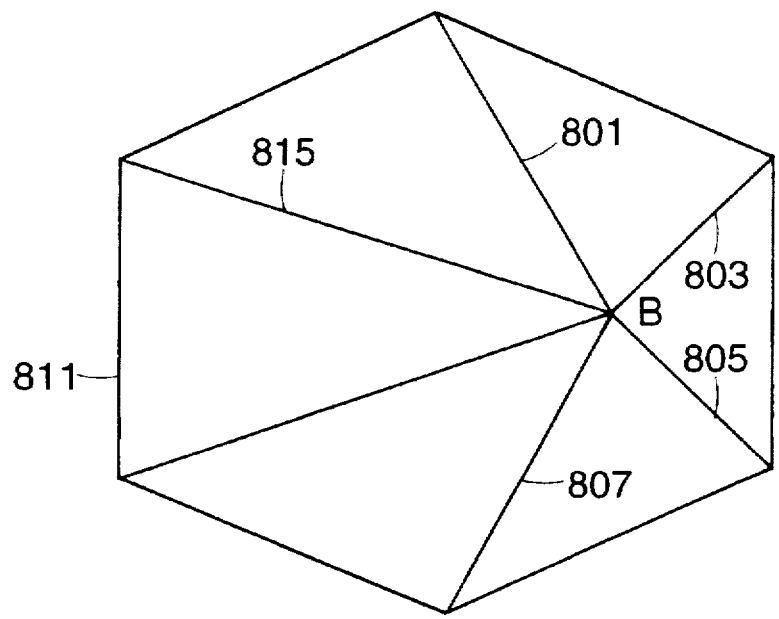

FIGS. 8a–8b are before and after drawings of how the model of the 3D object is affected when the Discard Edges By Length technique is used. FIG. 8a illustrates an example of a single eight-triangle mesh from the larger model of a 3D object before any edges have been discarded. When the user adjusts slider 423 such that edge 813 in FIG. 8a (the edge connecting triangle apex points A and B) is shorter than the selected edge discard length, the underlying polygon reduction algorithm determines which point, A or B, has the shorter average edge length and then removes that point from the data set that defines the 3D model and replaces it with the remaining point (in the case illustrated, Point A is removed from the data set and replaced with Point B). The logic underlying the Discard Edges By Length technique is illustrated by the flowchart of FIG. 9.

After a edge having a length shorter than the value chosen by the user is identified within the 3D model data set at step 901, the average length of the edges connected to points A and B are calculated at steps 903 and 905, respectively. At step 907, the calculated average lengths for point A and B are compared. If the edges connected to point A (edges 813, 809, 811, 815 and 817 in FIG. 8a) are, on the average, longer than the average length of the edges connected to point B (edges 801, 803, 805, 807 and 813 in FIG. 8a), then point B is replaced in the 3D model data set with point A in step 909. Otherwise, point A is replaced in the data set with point B in step 911. Whichever step is executed—step 909 or 911—effectively removes one point and one edge from the 3D model.

Figure 9:
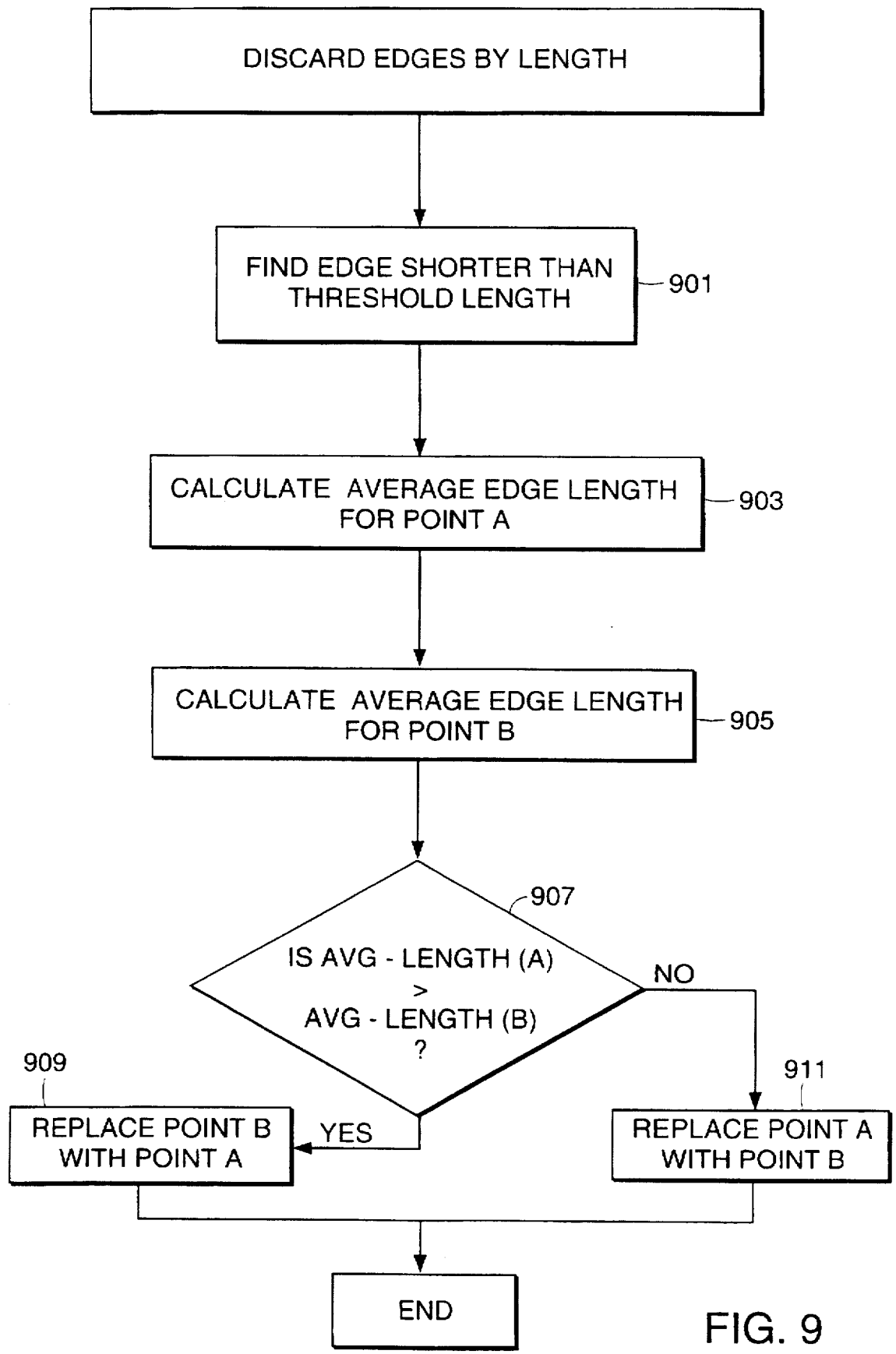
FIG. 9 is a flowchart of removing triangle edges.

Although the particular logic shown in FIG. 9 uses average connected edge length as a basis for comparison in step 907, other criteria may be used instead (e.g., randomly selecting one of the two points under consideration or selecting the point that has the lowest X, Y, Z value). Alternatively, a third point may be calculated, for example, the midpoint of the two points under consideration, and used to replace each of the two points.

In the example shown in FIGS. 8a–8b, it is assumed that point A has been determined to have the shorter average edge length. Consequently, point A and edge 813 connecting points A and B are discarded from the 3D model. The edges that were orphaned by the removal of point A (edges 809, 811, 815 and 817) are then connected to point B to form six triangles, as shown in FIG. 8b. Edges 817 and 801 have become identical at this point, as have edges 809 and 807. Consequently, edges 817 and 809 are removed from the 3D mesh data set. However, since the data structure for each edge contains a list of triangles that utilize that edge (the "triIndList" for the POLYEdge data structure described in appendix B), that information first must be transferred from the data structures defining edges 817 and 809 to the data structures defining edges 801 and 807, respectively.

The removal of edges 817 and 809 eliminates the two triangles formed by edges 813, 817, 801, 807 and 809. The net result in this case—a loss of two triangles and two edges—is typical of most polygon reduction algorithms.

Figure 10A:
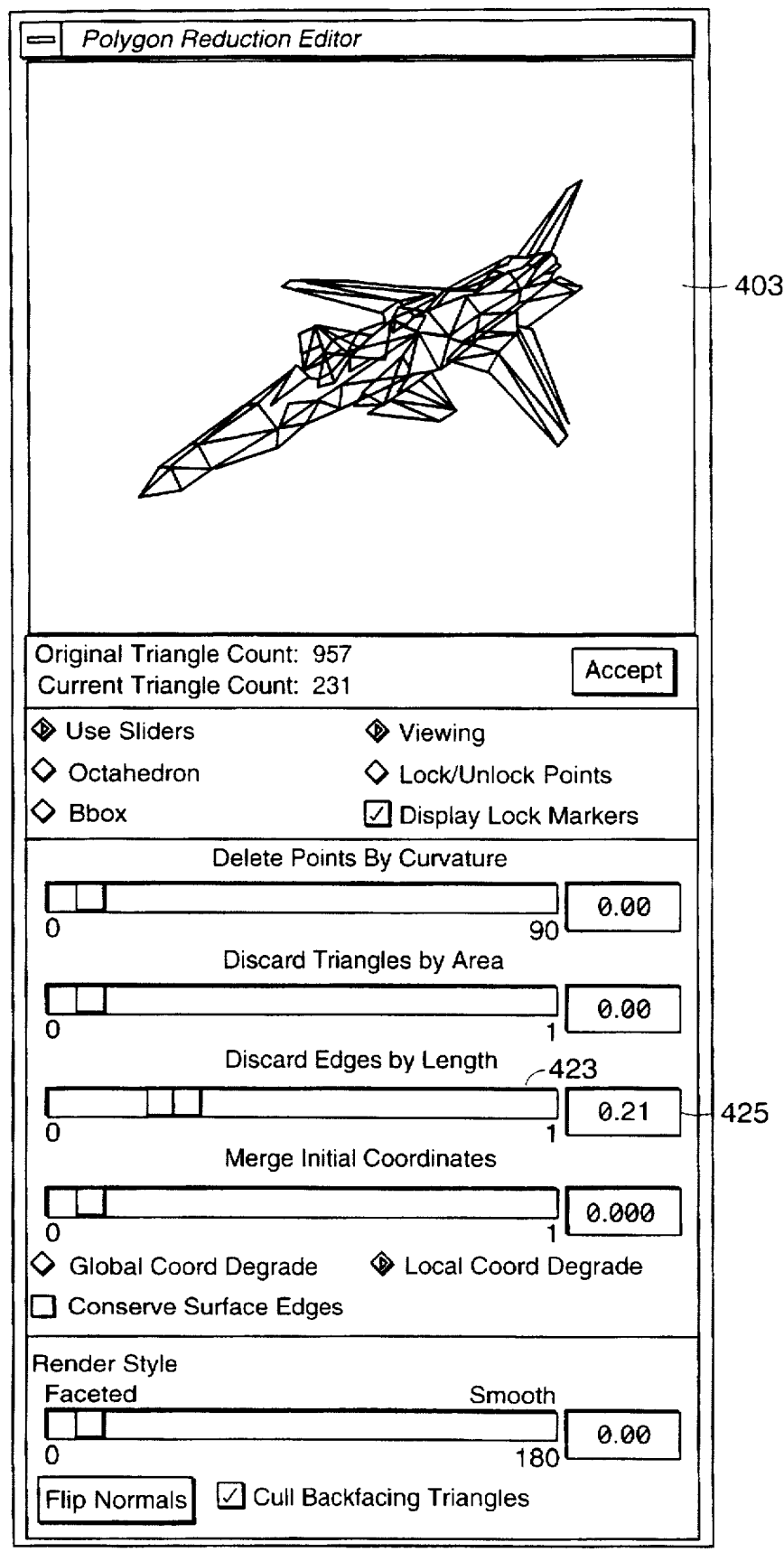
FIGS. 10a through 11b are exemplary screen displays from the polygon reduction editor program.
Figure 10B:
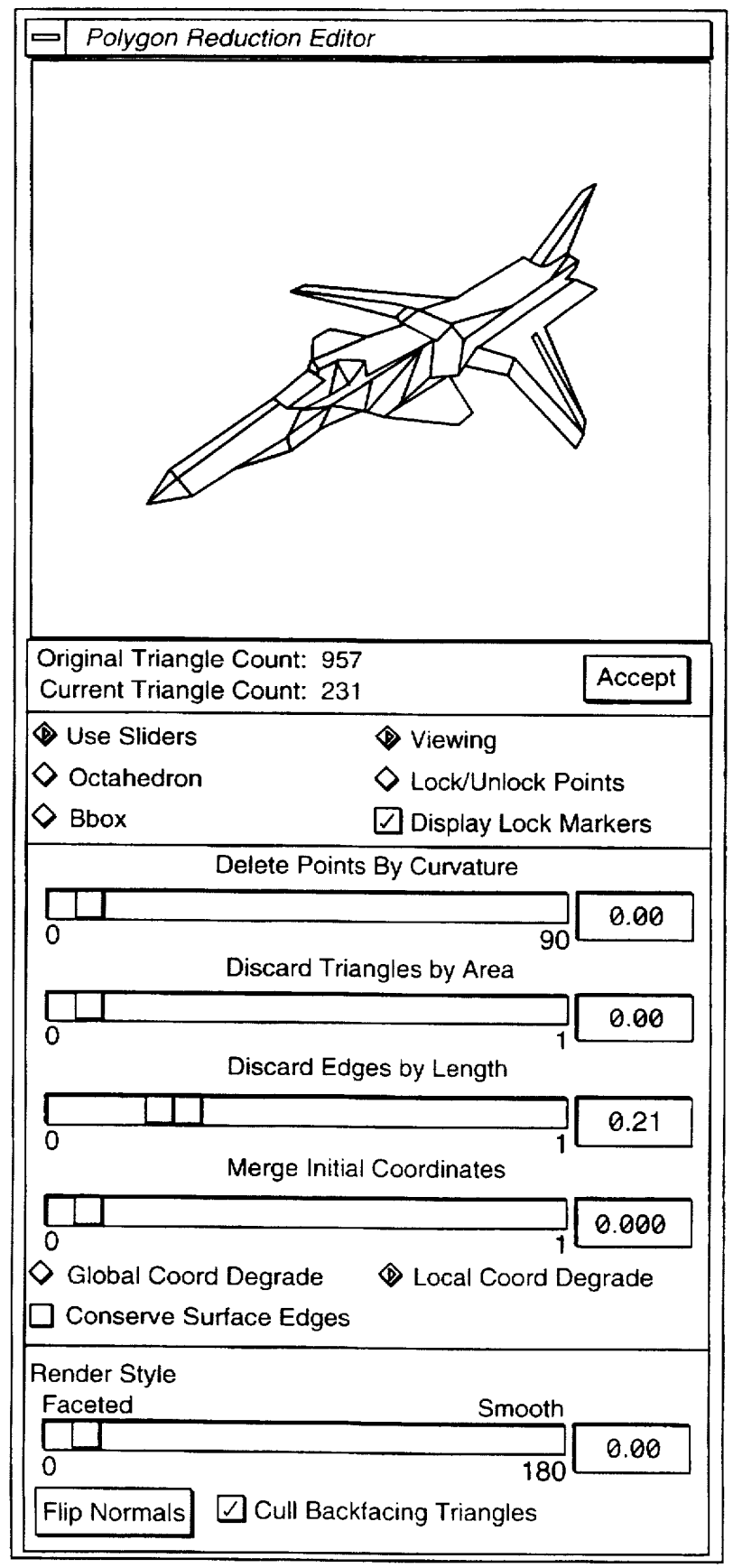

FIGS. 10a–11b show 3D object 403 with diminishing polygon counts as the user moves slider 423 closer to the maximum value. In FIGS. 10a–10b, the user has positioned slider 423 such that all triangle edges shorter than 0.21 of the longest dimension in the 3D object are removed from 3D object 403. Although this action reduces the Current Triangle Count to 231 (about 24% of the Original Triangle Count), the resulting image remains reasonably undistorted and recognizable, and thus suitable for medium to far viewing ranges.

Figure 11A:
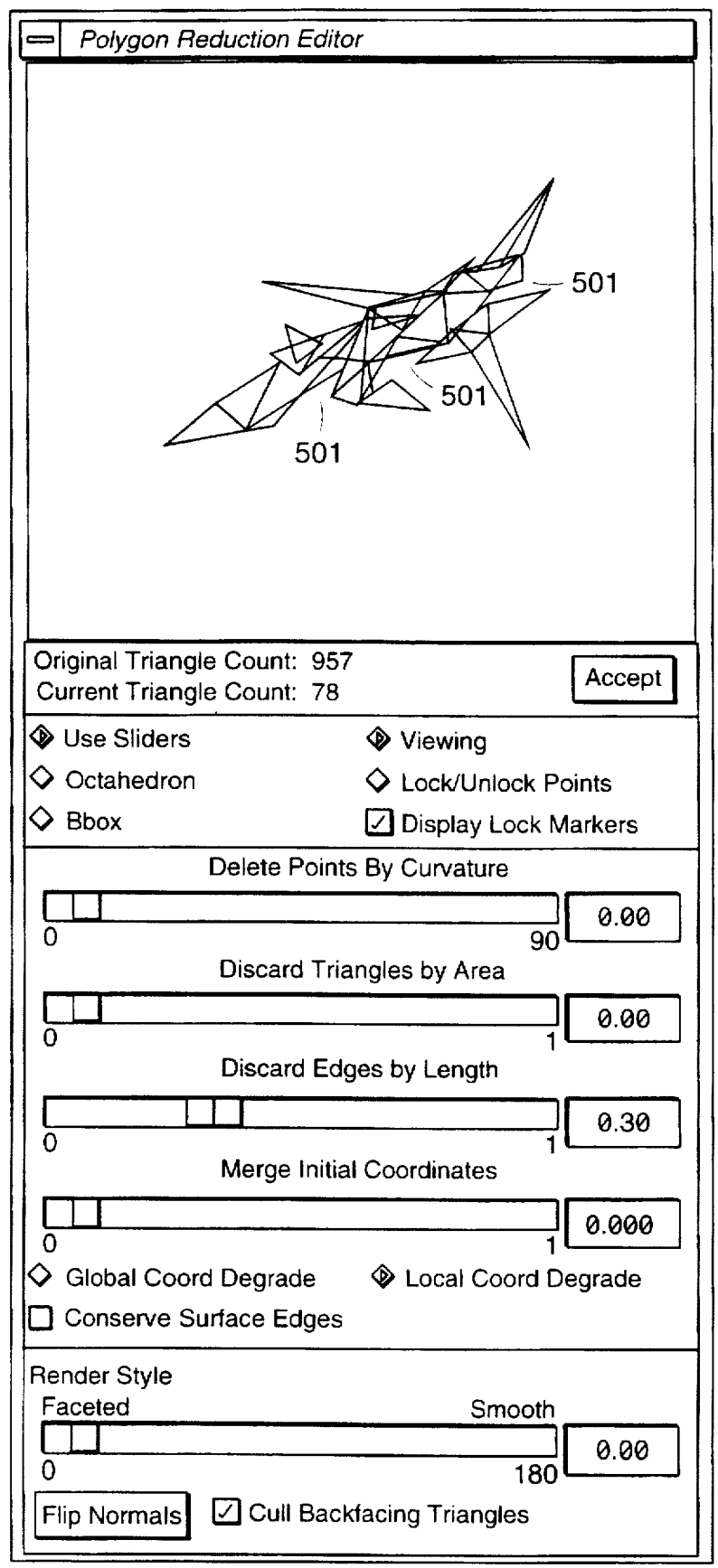
Figure 11B:
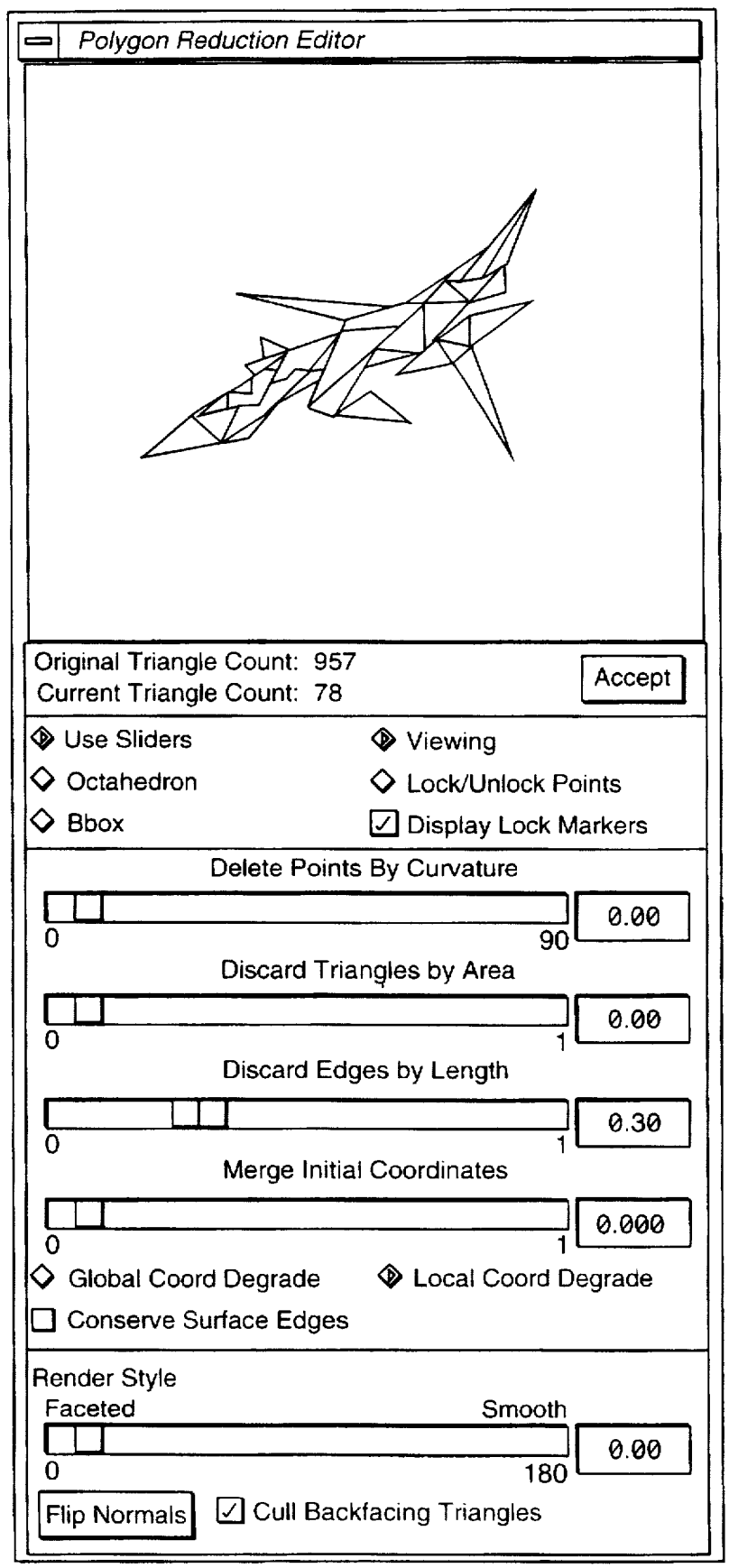

As the user moves slider 423 even closer to the maximum value (e.g., to 0.30 as illustrated in FIGS. 11a and 11b), the Current Triangle Count is reduced to such a low level (78 triangles or 8% of Original Triangle Count) that the 3D object image becomes less cohesive and thus less recognizable, with gaps 501 forming in the object. Depending on the application and the associated viewing range, the object illustrated in FIGS. 11a and 11b might represent an unacceptably low quality image for any LOD.

Figure 12A:
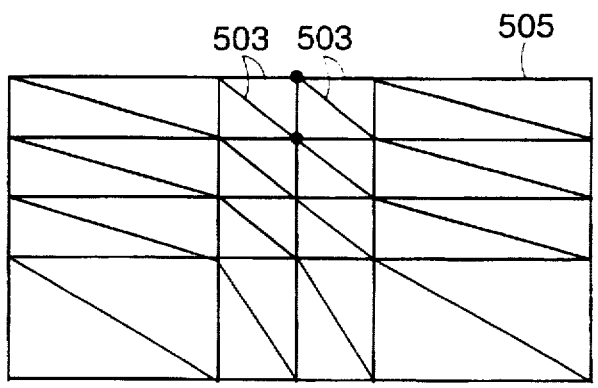
FIGS. 12a through 12e are sequential views of a triangulated surface.
Figure 12B:
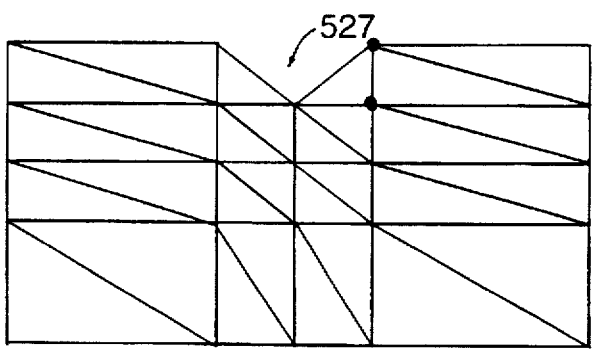
Figure 12C:
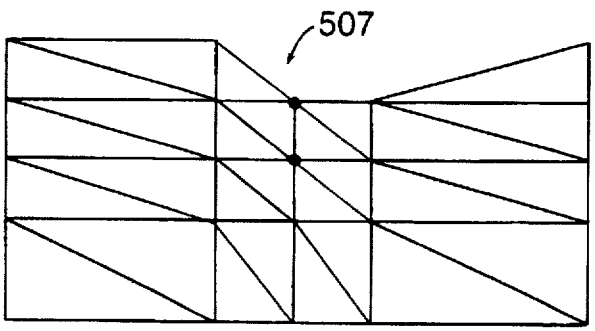
Figure 12D:
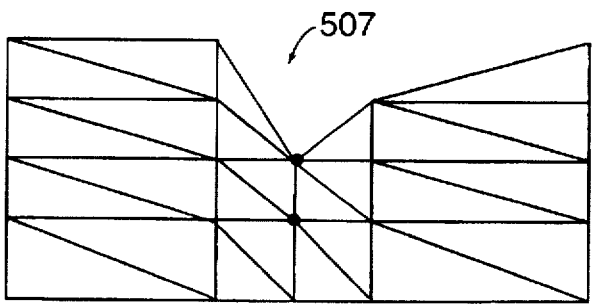
Figure 12E:
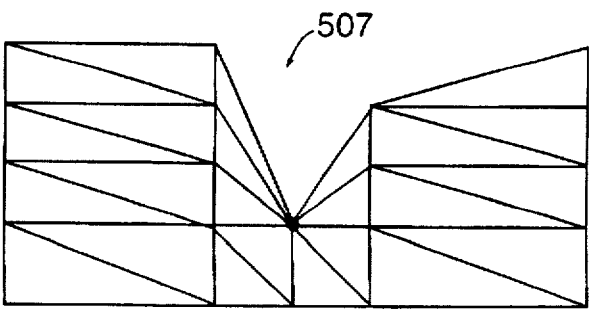

FIGS. 12a–12e, which depict sequential views of a small triangulated region in a larger 3D model undergoing polygon reduction, illustrate why gaps sometimes form in the 3D object as the triangle count is reduced. Specifically, the more detailed regions of a 3D object are generally modeled using smaller triangles which necessarily have shorter edges, for example, short edges 503 in FIG. 12a. When these short edges 503 are located at or near a surface boundary edge 505 of the 3D object, a hole 507 in the S surface of the 3D object begins to appear as in FIG. 12b when the short edges 503 are removed in response to placement of slider 423 at a particular setting. As the polygon count is further reduced as shown in FIGS. 12c–12e, the hole 507 becomes more and more pronounced, thus diminishing the cohesiveness of the 3D object.

Conserve Surface Edges

The Conserve Surface Edges feature of the Polygon Reduction Editor is a tool that, when used in conjunction with one or more of the four polygon reduction techniques, maintains the boundary edges of non-closed surfaces of the 3D object being modeled. This prevents gaps from occurring in the surface of a 3D object when the triangle count has been drastically reduced. When this feature is desired, the user clicks on the Conserve Surface Edges box 441 thereby causing a check mark to appear indicating that the feature is active.

Figure 13A:
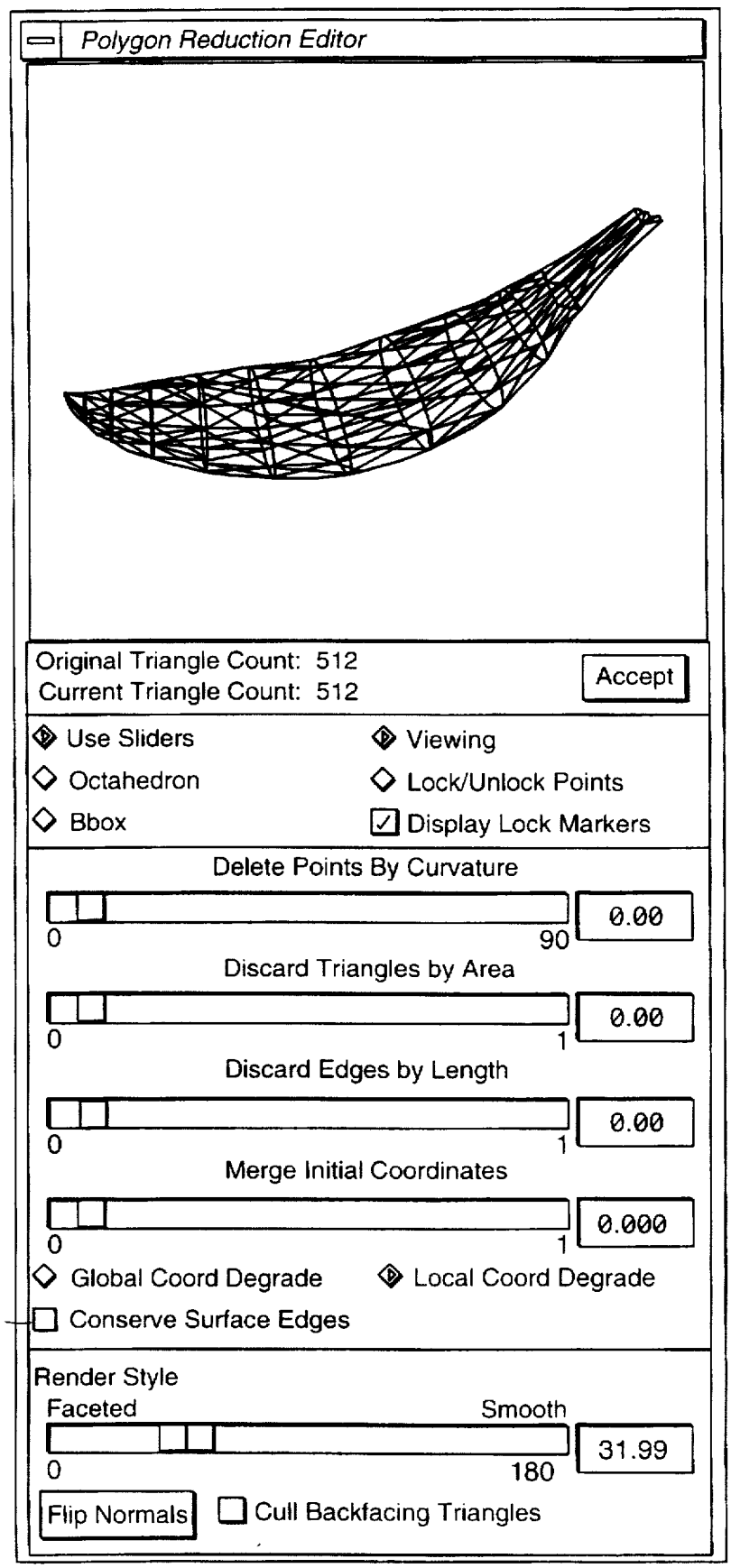
FIGS. 13a through 15b are exemplary screen displays from the polygon reduction editor program.
Figure 13B:
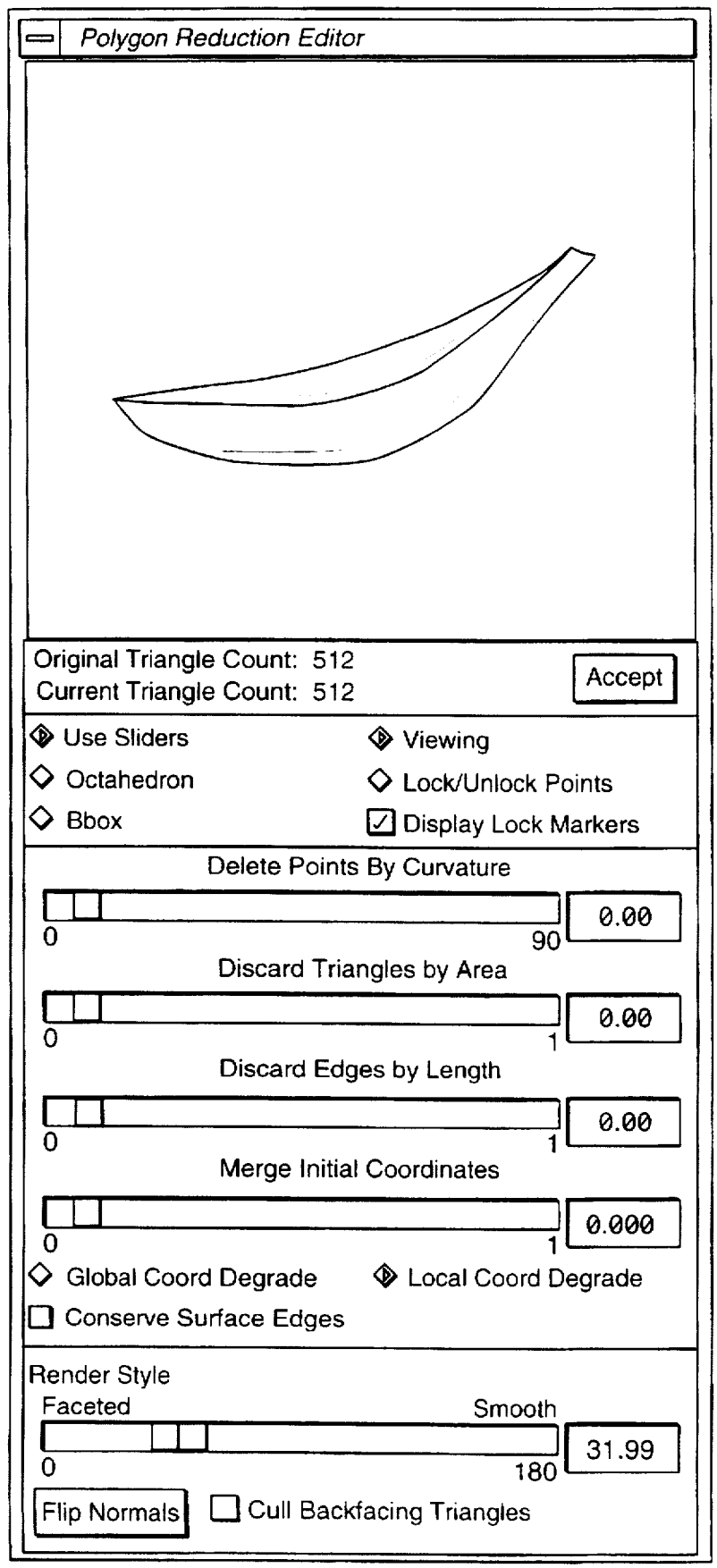

The Conserve Surface Edges feature identifies "boundary edges" in the 3D model—that is, triangle edges that are positioned on a surface boundary edge of the 3D object—and withdraws them from consideration by the particular polygon reduction algorithm(s) being used. Boundary edges are defined as those edges contained in only one triangle. In other words, when the Conserve Surface Edges feature is active the following two conditions inhere: (a) only those triangles that do not contain a boundary edge are candidates for removal in a polygon reduction algorithm; and (b) only those edges which are not themselves boundary edges are candidates for removal. An example of this feature is described in connection with the 3D image shown in FIGS. 13a and 13b—a banana with its full complement of 512 triangles intact.

Figure 14A:
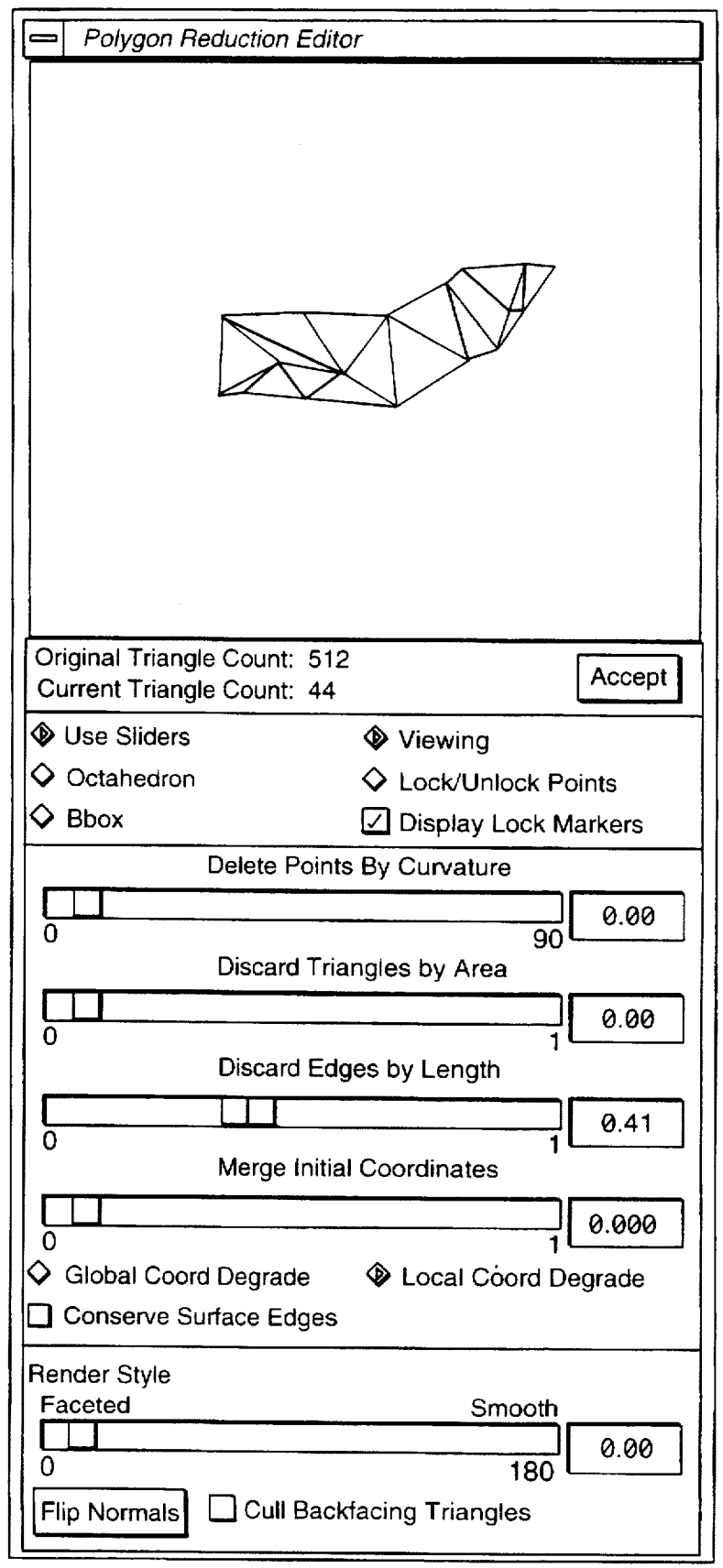
Figure 14B:
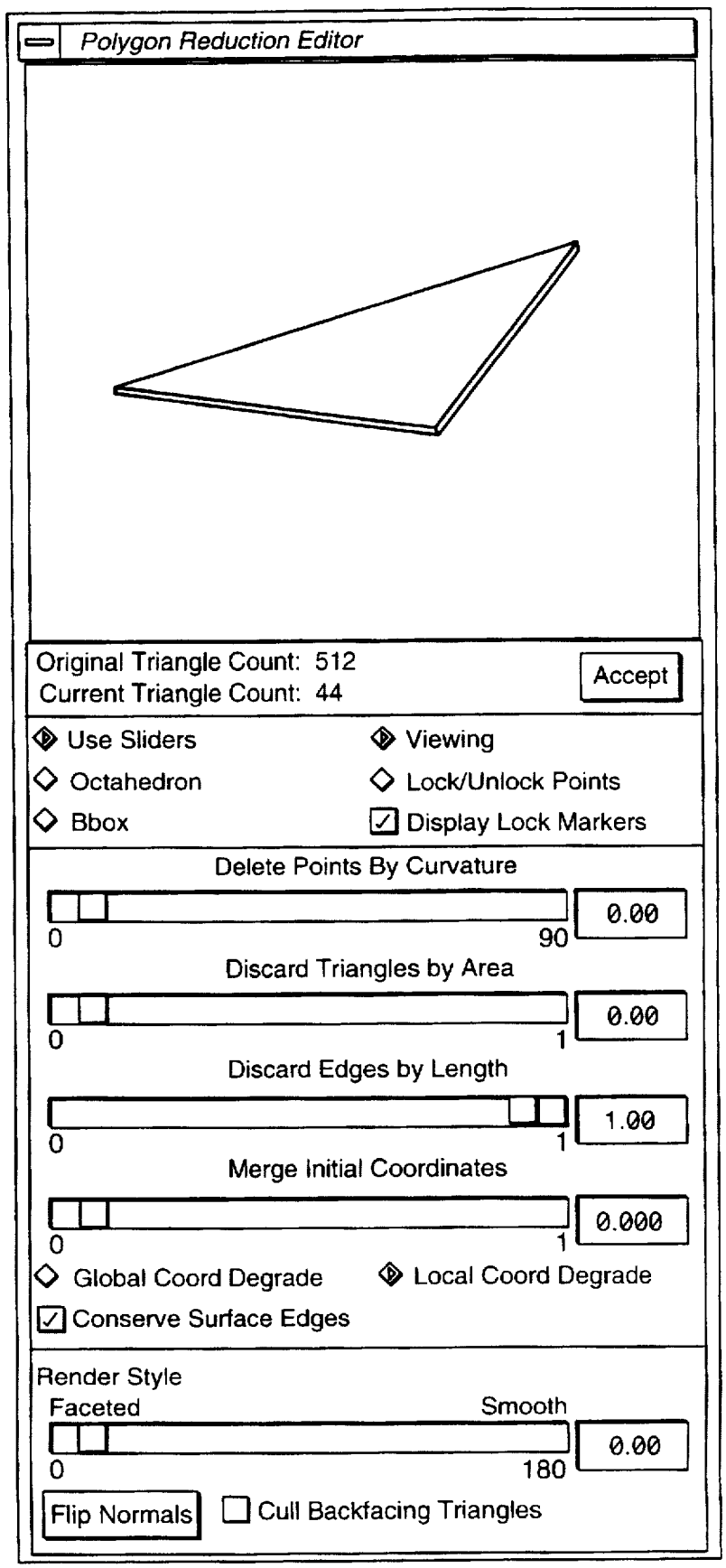

In FIG. 14a, the triangle count of the banana has been reduced to 44 without the benefit of the Conserve Surface Edges feature. The resulting image is somewhat crumpled, contains gaps and holes, and is diminished considerably in length and width. In FIG. 14b, in contrast, the triangle count of the banana also has been reduced to 44 but the Conserve Surface Edges feature has been activated by the user. In this case, the resulting banana image better approximates the actual shape, length and width of the complete banana image even though the same number of triangles is used. Consequently, the banana image in FIG. 14b would likely present a viewer with a more realistic image at a medium to far viewing range than would the banana image in FIG. 14a.

Although the Conserve Surface Edges feature works best with the Discard Edges By Length technique, it also produces good results when used in conjunction with any or all of the three other polygon reduction techniques made available by the Polygon reduction Editor (Delete points By Curvature, Discard Triangles By Area, and Merge Initial Coordinates, all discussed below).

Lock/Unlock Points

Lock/Unlock Points is another feature of the Polygon Reduction Editor that, when used in conjunction with one or more of the four polygon reduction techniques, enhances the ability of a user to reduce the polygon count in a 3D object while maintaining a high quality image.

Figure 15A:
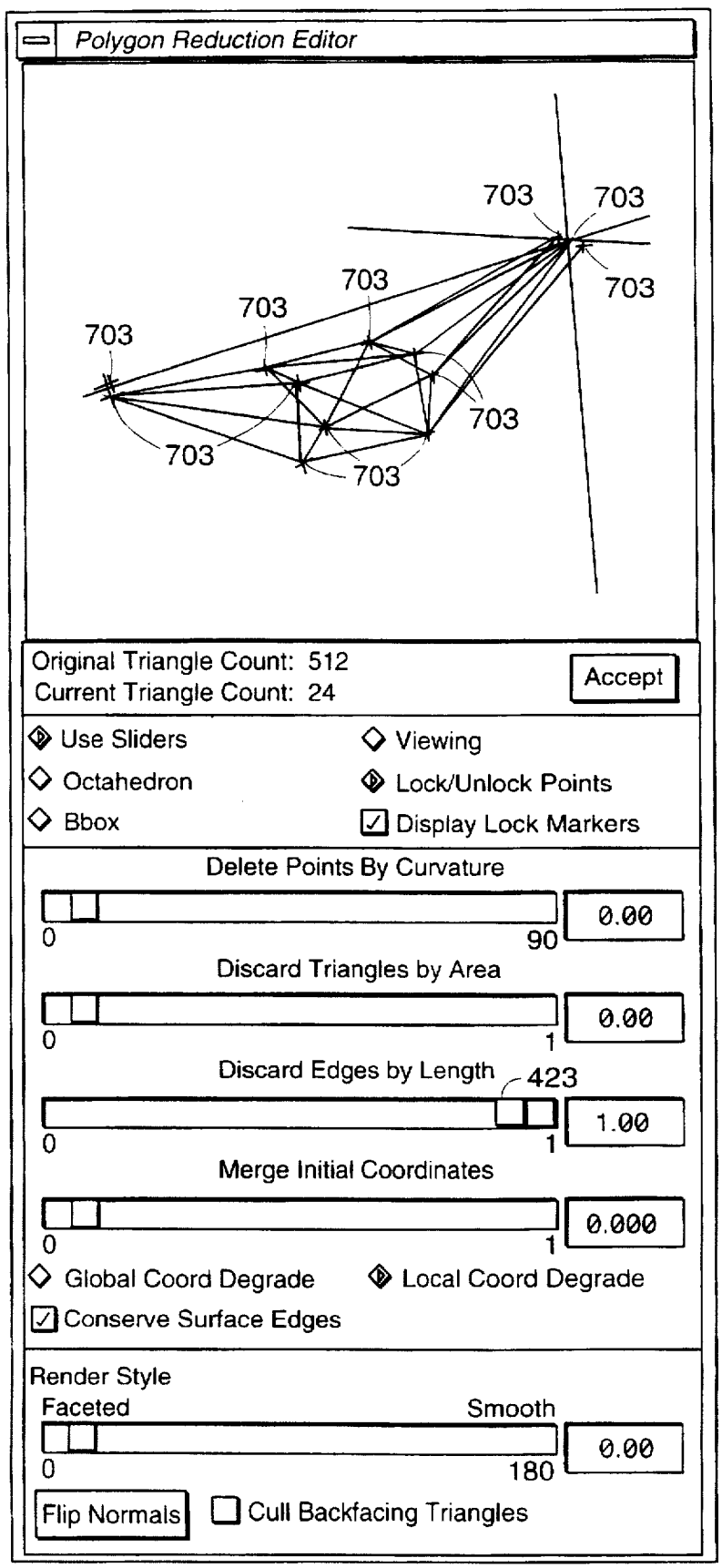

When it is desired to use the Lock/Unlock Points feature to reduce the number of triangles in the 3D image, the user clicks on the Lock/Unlock Points button 411 thereby causing a mark 701 to appear in the box indicating that the feature is active, as shown in FIG. 15a. Using the cursor or other input device, the user then selects one or more strategic points in the 3D object that, when preserved, maintain the integrity of the image. The particular points chosen depend on the object being modeled and, in part, on the personal preferences of the user. Another box, Display Lock Markers 413, allows the user to turn on and off cross-hair displays that indicate the location of the current lock points. This feature allows the user to temporarily view the object with less visual clutter.

The Lock/Unlock Points feature functions in a manner somewhat similar to the Conserve Surface Edges feature—that is, it withdraws the lock points, and any edges defined by lock points at both ends, from consideration by the particular polygon reduction algorithm(s) being used. Only those edges and points that are not preserved by user-selected lock points are candidates for removal in a polygon reduction algorithm.

In FIG. 15a, the user chose the thirteen particular lock points 703 that he felt best approximated the hull of a banana. After the lock points have been chosen, the user manipulates the desired widgets to effect polygon reduction by one or more of the available methods. In the case shown, the user positioned slider 423 at its maximum so that all edges in the 3D object, other than those preserved through the use of lock points 703, are removed from the 3D object model.

Figure 15B:
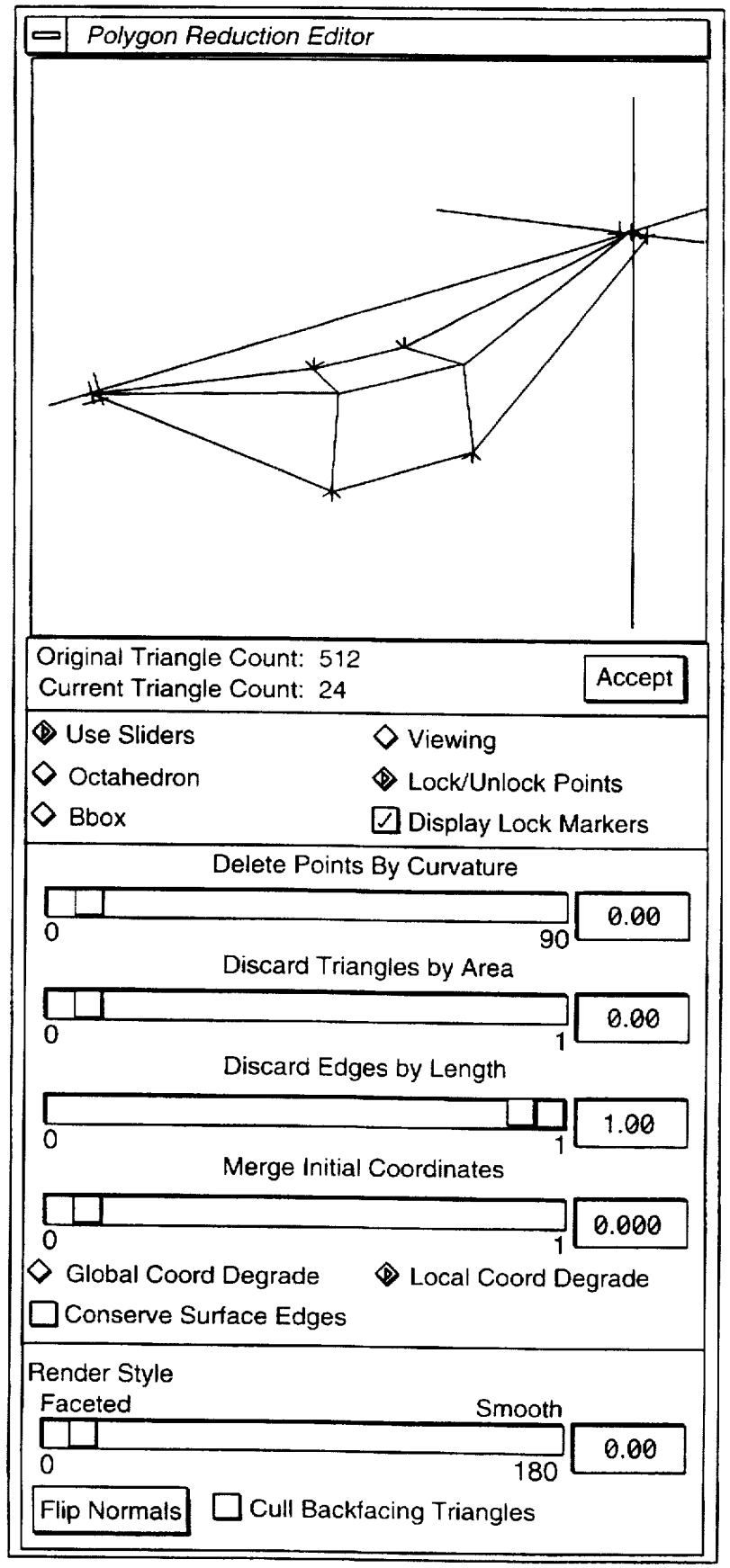

FIG. 15b shows the resulting image of the banana rendered in solid-surface form. As can be seen, the particular lock points that were chosen nicely preserve the shape of the banana even though the triangle count was reduced from 512 to 24 such that fewer than 5% of the original triangles remain. In contrast, the banana image in FIG. 14a, in which the lock points were not used, has degraded to relatively poor quality even though nearly twice as many triangles remain in the image of FIG. 14a than in the image of FIG. 15b.

As with the Conserve Surface Edges feature, the Lock/Unlock Points feature may be used with any or all of the four polygon reduction techniques made available by the Polygon Reduction Editor.

Discard Points By Curvature

Discard Points By Curvature is another technique for reducing the triangle count that becomes available in the Polygon Reduction Editor when the user clicks the Use Sliders button 449. To use this technique, the user moves slider 415 to the desired location, the particular value chosen is displayed in display indicator 417, and that value is used by the underlying polygon reduction algorithm to remove triangles from the 3D object. After triangle reduction is complete, the resulting image is rendered in real time in display region 405.

Figure 16A:
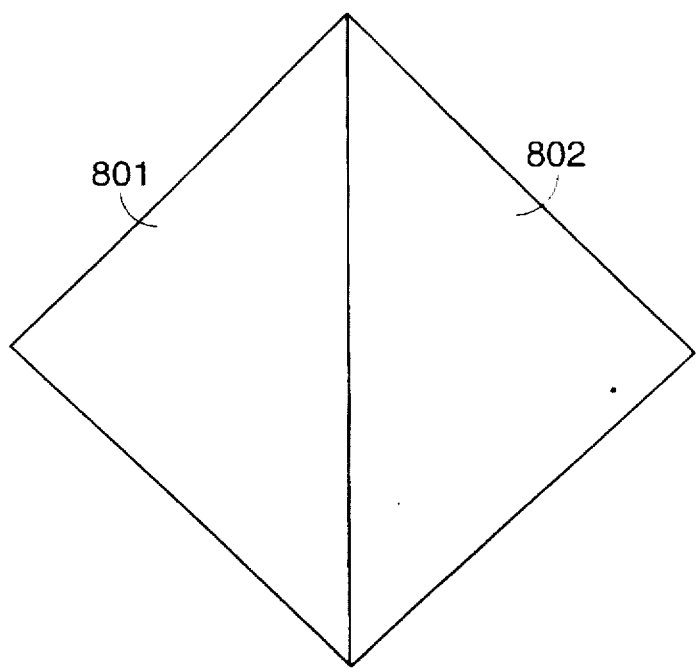
FIGS. 16a through 19b are views of triangulated surfaces.
Figure 16B:
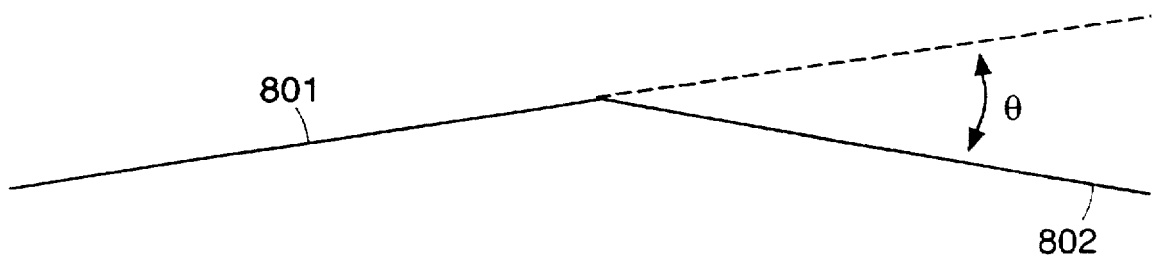

The polygon reduction algorithm that effects the Discard Points By Curvature technique measures the dihedral angle between each adjacent pair of triangles and removes those points that touch only upon edges having dihedral angles less than the slider value chosen by the user. The curvature values from which a user may pick range from 0 to 90, corresponding to the degree of the dihedral angle. FIGS. 16a and 16b are top and side views, respectively, of two adjacent triangles 801 and 802 with the dihedral angle between them represented as θ.

Figure 17A:
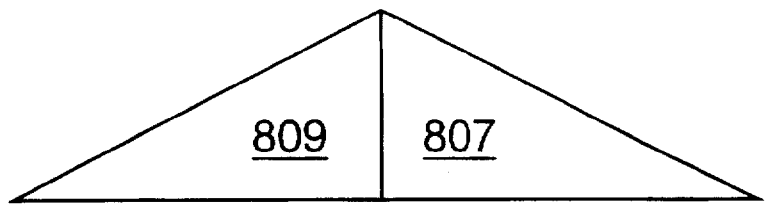
Figure 17B:
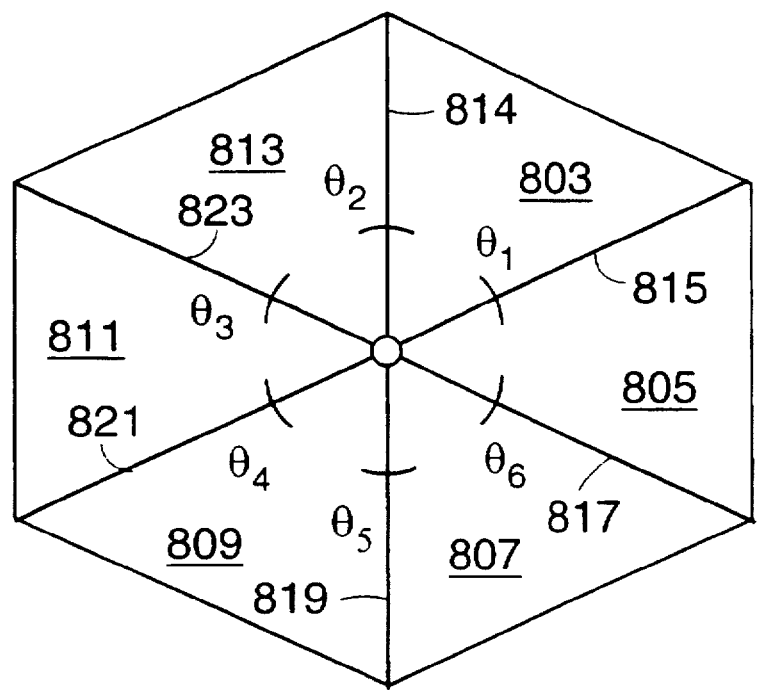

An example of how the Discard Points By Curvature algorithm works is illustrated in FIGS. 17a through 18b. FIGS. 17a and 17b are side and top views, respectively, of a six-triangle mesh in a larger 3D model. The loop is composed of triangles 803, 805, 807, 809, 811 and 813 separated by edges 814, 815, 817, 819, 821 and 823 and having a dihedral angle $\theta_1$, $\theta_2$, $\theta_3$, $\theta_4$, $\theta_5$ or $\theta_6$ between each adjacent pair of triangles.

Figure 18A:
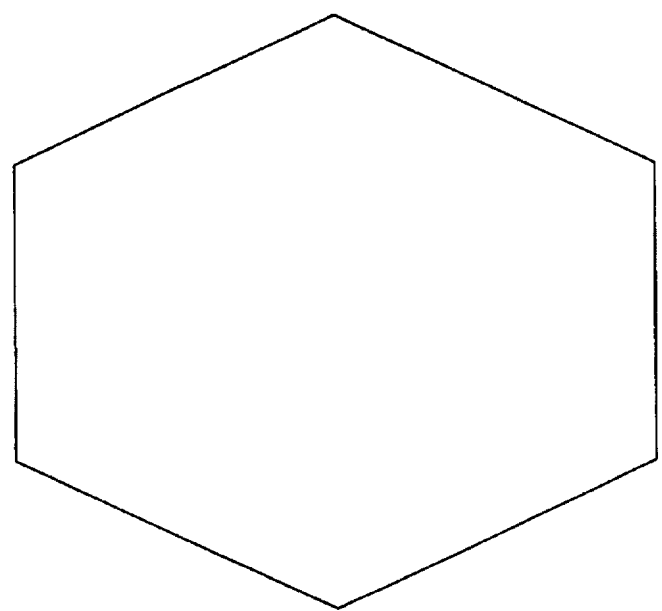
Figure 18B:
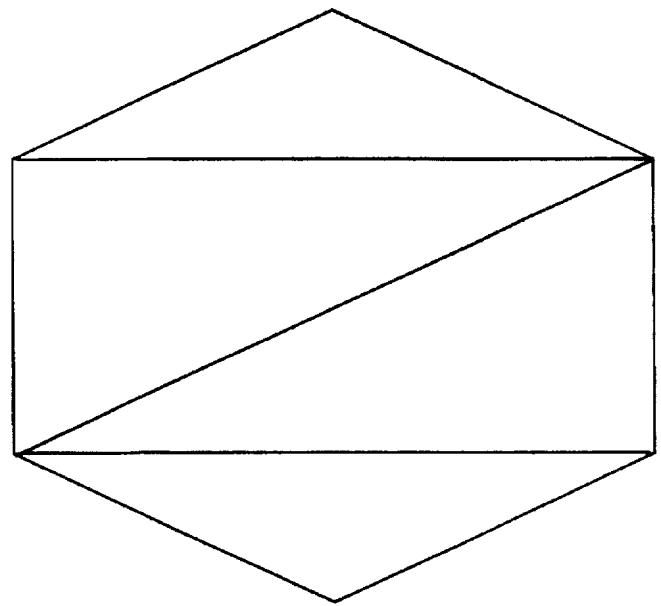

In this example, because each of the dihedral angles $\theta_1$–$\theta_6$ has been determined to be less than the value selected by the user with slider 415, the polygon reduction algorithm effectively removes all of the edges 814, 815, 817, 819, 821 and 823 as shown in FIG. 18a, and then retriangulates, for example, in the manner illustrated in FIG. 18b. The net result is a loss of two triangles.

In implementing the Discard Edges By Curvature technique, the triangulation methods provided in Silicon Graphics OpenGL were used, but any standard triangulation algorithm would also work.

Discard Triangles By Area

Discard Triangles By Area is another technique for reducing the triangle count that becomes available in the Polygon Reduction Editor when the user clicks the Use Sliders button 449. To use this technique, the user moves slider 419 to the desired location and the particular value chosen is displayed in indicator 421. This value is used by the underlying polygon reduction algorithm to remove triangles from the 3D object, after which the resulting image is rendered in real time in display region 405.

The polygon reduction algorithm that effects the Discard Triangles By Area technique measures the area of each triangle in the mesh and removes those triangles that have an area less than the value chosen by the user. The values from which a user may pick range from 0 to 1, with 1 corresponding to the area of a triangle having a base and a height equal in length to an imaginary bounding box for the 3D object. This provides a value slightly larger than any triangle that could possibly fit in the box.

Figure 19A:
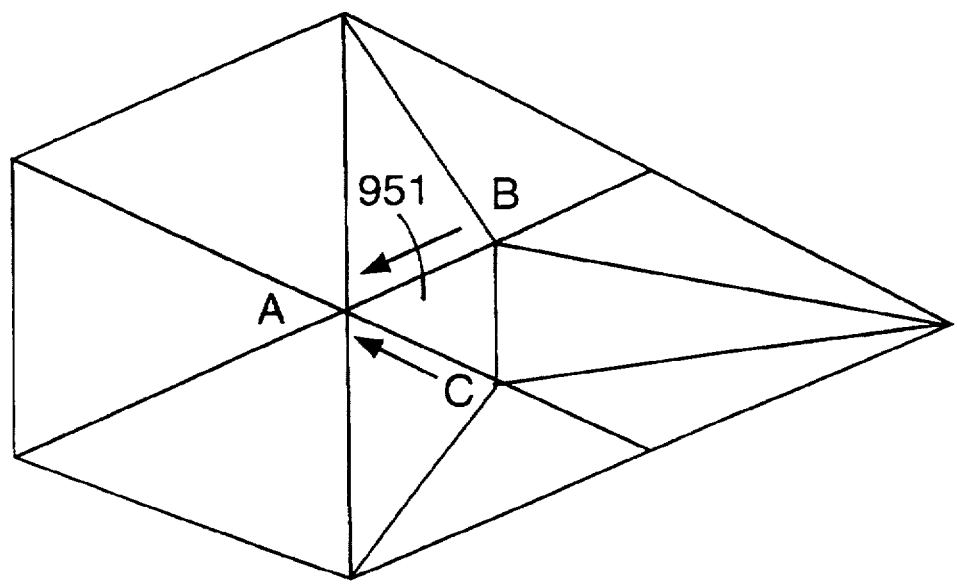
Figure 19B:
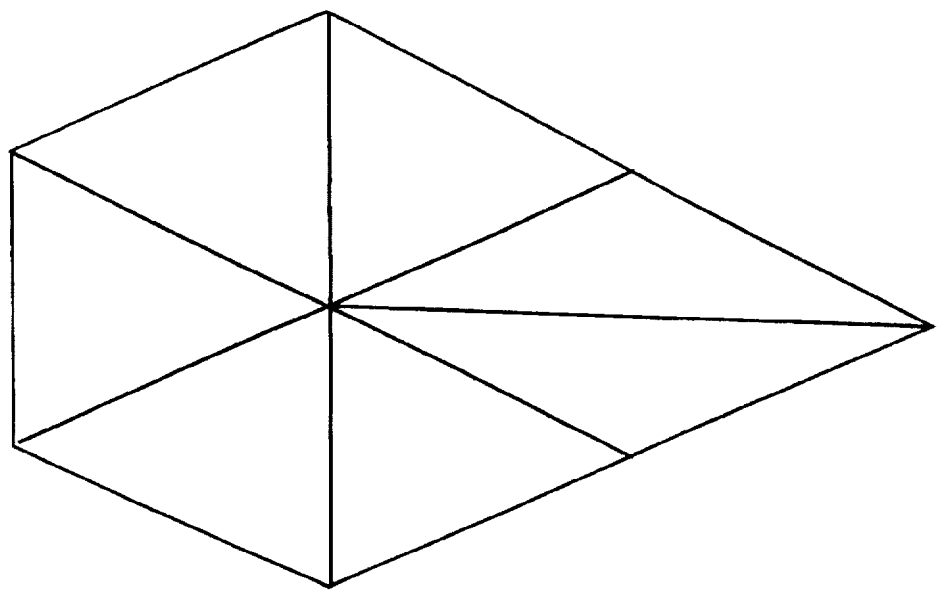

An example of how the Discard Triangles By Area algorithm works is illustrated in FIGS. 19a and 19b. FIG. 19a depicts eleven adjacent triangles within a larger 3D model. In this example, the triangle 951 defined by points A, B and C has been determined to have an area smaller than the value selected by the user. Consequently, the polygon reduction algorithm keeps the one triangle apex point that has the longest average connected edge length, and discards the other two triangle apex points from the 3D model data set. A net reduction of four triangles is realized in this example.

The Discard Triangles By Area algorithm decides which of the three points to keep through essentially the same logic as the Discard Edges By Length algorithm described above in conjunction with the flowchart of FIG. 9; the only difference is that the Discard Triangles By Area algorithm calculates the average connected edge length for three points (A, B and C) rather than just two, and discards two points rather than just one. This result can be achieved by two iterations of the method illustrated in FIG. 9—for example, a first iteration to determine which of points A and B has the shorter average connected edge length, and a second iteration to determine which of point C and the remaining point from the first iteration has the shorter average connected edge length. The triangle itself is removed through two iterations of the Discard Edges By Length algorithm illustrated in the flowchart of FIG. 9. For example, first edge A–B could be removed in one iteration and then edge A–C could be removed in a subsequent iteration.

Merge Initial Coordinates

Merge Initial Coordinates is the fourth technique for reducing the triangle count that becomes available in the Polygon Reduction Editor when the user clicks the Use Sliders button 449. The Merge Initial Coordinates technique merges multiple points into one coordinate value if they are within a certain distance of each other. To use this technique, the user moves slider 427 to the desired location and the particular value chosen is displayed in indicator 429. This value is used by the underlying polygon reduction algorithm to remove triangles from the 3D object, after which the resulting image is rendered in real time in display region 405.

In the Merge Initial Coordinates technique, first the 3D object is divided logically into a number of octels (equivalently, "cuboids" or "voxels") such that each octel contains one or more triangle apexes. The size of each edge in an octel is equal to the length of the diagonal of the imaginary bounding box for the 3D object multiplied by the particular slider value (from 0.000 to 1.000) chosen by the user. Using a standard hashing function, one triangle apex is selected to be persistent for each octel. In the preferred embodiment, the hashing function selects the lower, left, rear triangle apex in each octel as the persistent point (i.e., the triangle apex having the lowest X, Y, Z value).

To remove triangles from the 3D mesh, the Merge Initial Coordinates algorithm runs through each triangle apex in the mesh and removes it from the data set if that apex is not the chosen persistent point for the octel under consideration. The resulting data set defines a mesh that has exactly one triangle apex in each octel. As the user moves slider 427 closer to its terminal value of 1.000, larger octel sizes are used resulting in fewer polygons in the 3D mesh.

Other Features

The Polygon Reduction Editor has several other features that facilitate user interaction in creating new LODs.

A. Viewing

When the Viewing button 409 is selected, it allows the user to alter the eye point relative to the 3D object through various mouse movement and mouse button clicking techniques.

In one embodiment, two different mouse buttons are used for this feature. If the left mouse button is held in the down position while moving the mouse, the 3D object rotates (or "tumbles") in the direction of mouse movement. If the right mouse button is depressed while moving the mouse, the eye point translates in the direction of mouse movement with respect to the 3D object (up/down or left/right). If both mouse buttons are depressed while moving the mouse towards or away from the user, the eye point is moved closer or farther away, respectively, from the 3D object.

In addition, the "velocity" of the mouse at the moment of button release can be measured and used to simulate inertial movement of the 3D object for an appropriate duration after the mouse button has been released.

Selection of the Viewing button 409 is mutually exclusive with selection of the Lock/Unlock Points button 411.

B. Render Style

A fifth slider 433 and display indicator 435 are provided to allow the user to select the degree of smoothing that is used in rendering the 3D object. Any standard smoothing algorithm may be used. Smoothing has no effect on the number of triangles in the mesh for the 3D object.

In the preferred embodiment, the rendering algorithm used by the Polygon Reduction Editor will smooth an edge between adjacent triangles if the dihedral angle (in degrees) between the faces of those triangles is less than the slider value chosen by the user.

C. Cull Backfacing Triangles

When the user selects the Cull Backfacing Triangles feature by clicking on box 437, the rendering algorithm used by the Polygon Reduction Editor will render only those triangles in the 3D mesh that will be visible to the user after the 3D object has been rendered. The invisible backfacing triangles will not be stored in the computer file that defines the resulting LOD. This feature has no effect on the number of triangles that are present in the 3D object model, but it may reduce the number of triangles that are actually rendered, thus speeding up system performance D. Flip Normals The Flip Normals feature is functional only when the Cull Backfacing Triangles feature is active. When a 3D object is being displayed such that the backfacing triangles are culled, a click by the user on the Flip Normals button 439 switches the set of surfaces, front or back, that are rendered.

Figure 20A:
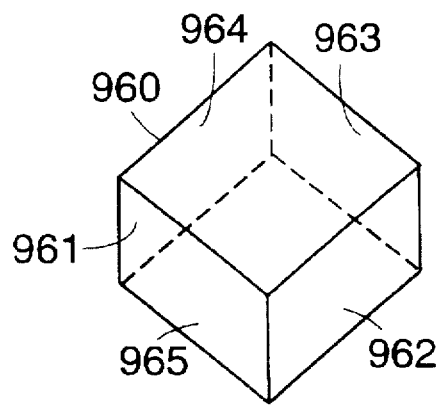
FIGS. 20a through 20c are isometric views of a cube.
Figure 20B:
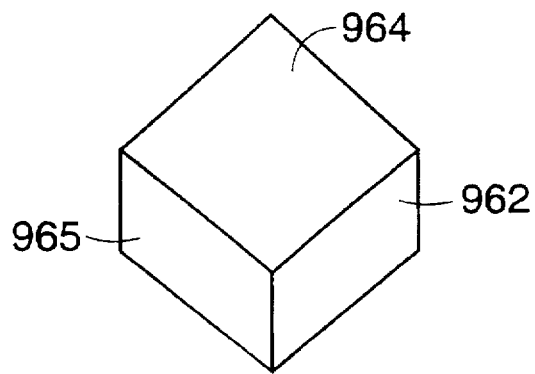
Figure 20C:
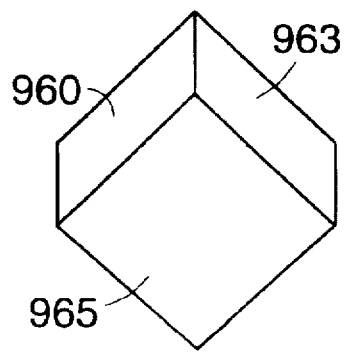

An example of the Flip Normals feature is illustrated in FIGS. 20a-20c, in which the 3D object under consideration is cube having six surfaces 960-965. In FIG. 20b, assume that the cube to be rendered is a box in the viewer's line of sight. Accordingly, because the Cull Backfacing Triangles feature is active, only the three front surfaces of the box that the viewer will actually see—surfaces 962, 964 and 965—are rendered.

In FIG. 20c, in contrast, assume that the cube to be rendered is a room in a house in which the viewer is standing. Consequently, because the viewer would expect to see a floor underneath him and two walls in front of him, only the back three surfaces of the cube (960, 963 and 965) should be rendered. To achieve this result the user may click on the Flip Normals button 439 which will cause the three back surfaces of the cube to be rendered rather than the three front surfaces. Each successive click of the Flip Normals button 439 will reverse which set of surfaces, front or back, are rendered.

E. Global/Local Coordinate Degrade

The Global Coord Degrade button 443 and the Local Coord Degrade button 431 have significance only when two or more separate 3D objects are being edited concurrently by the Polygon Reduction Editor. When the Local Coord Degrade button 431 is selected, each separate 3D object is degraded using its own imaginary bounding box as a parameter. When the Global Coord Degrade button 443 is selected, a collective imaginary bounding box encompassing all 3D objects in the scene is used in degrading each individual 3D object. The Global Coord Degrade feature and the Local Coord Degrade feature are mutually exclusive—that is, the user must choose one or the other by clicking on the appropriate buttons 443 or 431.

F. Accept

Once the number of triangles has been reduced to a suitably low number while maintaining an acceptably high level of image quality, the user may click on the Accept button 407 to create a computer file of the 3D object at the current LOD. After creating the desired number of LOD files, the user may use another tool (e.g., Silicon Graphics' Level of Detail Editor) to associate each LOD file with a particular viewing range. A description of the Level of Detail Editor is attached as Appendix C.

Other embodiments are within the scope of the following claims.

What is claimed is:

1. A method for use in modeling a 3D graphic object as subelements on a display, the method comprising:
    displaying user-interface abstractions which respectively represent different criteria for altering the number of subelements in a model of the 3D graphic object; and
    interactively:
        receiving input from the user through at least one of the user-interface abstractions; and
        generating a model of the 3D graphic object having an altered number of subelements based on the input received from the user.

2. The method of claim 1 wherein the subelements comprise polygons.

3. The method of claim 1 further comprising:
    displaying surfaces of the 3D graphic object based on the altered number of subelements.

4. The method of claim 3 wherein the displaying comprises allowing the user to choose which surfaces of the 3D graphic object are displayed.

5. The method of claim 1 further comprising:
    creating a computer file representative of the 3D graphic object using the altered number of subelements.

6. The method of claim 1 further comprising:
    displaying the 3D graphic object prior to receiving input from the user; and
    after receiving input from the user, modifying the display of the 3D graphic object substantially in real time based on the user's input.

7. The method of claim 1 further comprising:
    receiving a second iteration of input from the user;
    refining the number of subelements based on the second iteration of input to provide visual feedback to the user;
    receiving a third iteration of input from the user based on the visual feedback provided by the refining.

8. The method of claim 1 wherein the altering comprises forming an octahedron around the 3D graphic object.

9. The method of claim 1 wherein the altering comprises forming a bounding box around the 3D graphic object.

10. The method of claim 1 wherein the altering comprises deleting points in the 3D graphic object by curvature.

11. The method of claim 1 wherein the altering comprises discarding polygons in the 3D graphic object by area.

12. The method of claim 1 wherein the altering comprises discarding polygon edges in the 3D graphic object by length.

13. The method of claim 1 wherein the altering comprises merging initial coordinates in the 3D graphic object.

14. The method of claim 1 further comprising locking user-selected points in the 3D graphic object to prevent a portion of the subelements from being altered.

15. The method of claim 1 wherein the altering comprises conserving surface boundary edges in the 3D graphic object.

16. The method of claim 1 further comprising allowing the user to override at least a portion of the altering.

17. The method of claim 1 further comprising:
associating the 3D graphic object having the altered number of subelements with a particular viewing range or level of detail.

18. A method of changing a level of detail in a 3D graphic object comprising:
displaying a user-interface abstraction that represents a predetermined criterion for altering the level of detail in a model of the 3D graphic object;
interactively receiving input from a user through the user-interface abstraction;
generating a model of the 3D graphic object based on the received input, the display of the another model providing visual feedback to the user on how the input affects the level of detail in the 3D graphic object.

19. The method of claim 18 wherein the feedback is provided to the user substantially in real time.

20. The method of claim 18 further comprising associating the 3D graphic object having the changed level of detail with a particular viewing range.

21. An interface for a computer system comprising:
a display of a 3D graphic object represented by a model comprising a quantity of polygons;
a graphical interface device that allows a user to interactively alter the polygon quantity by instructing the computer system to generate another model of the 3D graphic object for display, wherein the display of the 3D graphic object is altered substantially in real time in response to the user's alteration of the polygon quantity.

22. The graphical user interface of claim 21 wherein the graphical interface device comprises graphic user-interface abstractions which respectively represent different criteria for altering the polygon quantity based on input from the user.

23. The graphical user interface of claim 21 further comprising a user-interface abstraction that enables the user to at least partially override alteration of the polygon quantity.

24. A method of reducing a number of polygons in a 3D graphic object comprising:
locating a polygon edge in the 3D graphic object that is shorter than a predetermined length, the polygon edge being defined by points A and B;
eliminating at least one of points A and B in accordance with a predetermined basis for comparison.

25. The method of claim 24 wherein the eliminating comprises replacing one of point A and point B with the other.

26. The method of claim 24 wherein the eliminating comprises replacing each of point A and point B with another point.

27. The method of claim 24 wherein the predetermined basis for comparison comprises an average length for polygon edges connected to each of points A and B.

28. The method of claim 27 wherein the eliminating is based on which average length is shorter.

29. The method of claim 24 wherein the locating and eliminating are repeated until no polygon edge shorter than the predetermined length remains in the 3D graphic object.

30. The method of claim 24 further comprising:
interactively receiving the predetermined length from a user prior to the locating.

31. A method of reducing a number of polygons in a 3D graphic object comprising:
locating a polygon in the 3D graphic object that has an area less than a threshold size, the polygon being defined by points $A_1$ through $A_n$, where n is a positive integer greater than 2;
replacing points by using a selected one of points $A_1$ through $A_n$ to replace the remaining points in accordance with a predetermined basis of comparison.

32. The method of claim 31 wherein the predetermined basis for comparison comprises an average length for polygon edges connected to each of points $A_1$ through $A_n$.

33. The method of claim 32 wherein the replacing is based on which average length is longest.

34. The method of claim 31 wherein the locating and replacing are repeated until no polygon having an area less than the threshold size remains in the 3D graphic object.

35. The method of claim 31 further comprising:
interactively receiving the threshold size from a user prior to the locating.

36. A method of reducing a number of polygons in a 3D graphic object comprising:
interactively receiving a threshold value from a user;
locating points in the 3D graphic object that collectively have a property value that is less than the threshold value; and
eliminating at least one of the located points from the 3D graphic object.

37. The method of claim 36 wherein the located points define a polygon edge and the property comprises length.

38. The method of claim 36 wherein the located points define a polygon and the property comprises area.

39. A method of reducing a number of polygons in a 3D graphic object comprising:
interactively receiving a threshold value from a user;
locating a point in the 3D graphic object at which the curvature between adjacent polygons is smaller than the threshold value;
removing all polygon edges connected to that point to create a void; and
filling the void left by the removing.

40. The method of claim 39 wherein the filling comprises triangulation.

41. A method of reducing a number of polygons in a 3D graphic object comprising:
interactively receiving a threshold value from a user;
dividing the 3D graphic into logical units based on the threshold value received from the user, each logical unit encompassing at least one polygon apex; and
removing all but one of the polygon apexes from each logical unit.

42. The method of claim 1, wherein the user-interface abstractions comprise at least one of the following: a button, a radio control, and a slide bar.

43. The method of claim 1, wherein generating a model comprises building a new model.

44. The method of claim 43, wherein building a new model comprises constructing data structures that relate vertices and edges.

45. The method of claim 18, wherein generating a model comprises building a new model.

46. The method of claim 21, wherein instructing the computer to generate another model comprises instructing the computer to build a new model.

47. A computer system for enabling users to alter the number of subelements used to display a 3D graphic object, the computer system comprising:

(A) a user interface comprising:
   (1) a display window for displaying a model of the 3D graphic object;
   (2) a plurality of widgets that receive user input, each widget corresponding to a different technique of reducing the number of subelements used to display the 3D graphic object; and (B) modeling software that builds a new model of the 3D graphic object for display in the display window by processing the user input received at each widget as input to computer instructions that reduce the number of 3D graphic object subelements in the model.

48. A method of changing a level of detail in a 3D graphic object having subelements, the method comprising:

displaying a first model of the 3D graphic object;

receiving user-selection input that locks a portion of the 3D graphic object; and generating a second model of the 3D graphic object with a reduced subelement count, the locked portion being unaltered in the first and second models.

49. The method of claim 48, wherein the locked portion comprises at least one of the following: a point, a set of points, and a polygon.

* * * * *